US009255438B2

(12) United States Patent
Pardue et al.

(10) Patent No.: US 9,255,438 B2
(45) Date of Patent: Feb. 9, 2016

(54) PRESS FIT STORM WINDOW SYSTEM

(71) Applicant: R VALUE, INC., Portland, OR (US)

(72) Inventors: Samuel Pardue, Portland, OR (US); Mark Pratt, Portland, OR (US); Richard Radford, Portland, OR (US)

(73) Assignee: R VALUE, INC., Portland, OR (US)

( * ) Notice: Subject to any disclaimer, the term of this patent is extended or adjusted under 35 U.S.C. 154(b) by 0 days.

(21) Appl. No.: 14/846,261

(22) Filed: Sep. 4, 2015

(65) Prior Publication Data

US 2015/0376938 A1 Dec. 31, 2015

Related U.S. Application Data

(63) Continuation-in-part of application No. 14/167,232, filed on Jan. 29, 2014, which is a continuation-in-part of application No. 12/877,952, filed on Sep. 8, 2010, now abandoned, which is a continuation-in-part of application No. 12/573,174, filed on Oct. 5, 2009, now Pat. No. 8,272,178.

(51) Int. Cl.

| | |
|---|---|
| ***E06B 3/28*** | (2006.01) |
| ***E06B 7/23*** | (2006.01) |
| ***B60J 10/00*** | (2006.01) |
| *E06B 9/00* | (2006.01) |

(52) U.S. Cl.

CPC ............... *E06B 3/28* (2013.01); *B60J 10/0031* (2013.01); *B60J 10/0065* (2013.01); *E06B 7/23* (2013.01); *E06B 2009/005* (2013.01)

(58) Field of Classification Search

CPC ..... B60J 10/0031; B60J 10/0065; E06B 3/28; E06B 7/16; E06B 7/23; E06B 7/2303; E06B 7/2309; E06B 2009/005

See application file for complete search history.

(56) References Cited

U.S. PATENT DOCUMENTS

| | | | |
|---|---|---|---|
| 1,546,764 | A | 7/1925 | Voit |
| 1,928,992 | A | 10/1933 | Clark et al. |
| 2,548,556 | A | 4/1951 | Ogden |
| 2,612,947 | A | 10/1952 | Jenks et al. |
| 2,622,286 | A | 12/1952 | Beck |

(Continued)

FOREIGN PATENT DOCUMENTS

| | | |
|---|---|---|
| DE | 8804447 | 12/1998 |
| FR | 2759112 | 8/1998 |

(Continued)

OTHER PUBLICATIONS

International Search Report and Written opinion for PCT/US2010/051503, mailed Dec. 14, 2010, 10 pages, European Patent Office, Rijswijk, Netherlands.

*Primary Examiner* — Robert Canfield

(74) *Attorney, Agent, or Firm* — Marger Johnson

(57) ABSTRACT

A system for mounting a secondary panel within a window frame of an existing window. The system includes a rigid panel, an elongated deformable bulb, and an elongated carrier. The bulb has a resilient, rounded portion and a base section with at least one tongue extending from the base section. The carrier is configured to receive at least a portion of an edge of the panel within a panel gap and to receive, between opposing resilient prongs, the tongue of the bulb. The resilient prongs are configured to diverge to allow a distal end of the tongue to pass between the resilient prongs. Also disclosed is a system for mounting a flexible sheet within a window frame of an existing window.

8 Claims, 25 Drawing Sheets

(56) References Cited

U.S. PATENT DOCUMENTS

| | | | | |
|---|---|---|---|---|
| 2,667,951 | A | | 2/1954 | Gall |
| 2,691,193 | A | | 10/1954 | Wissinger |
| 2,700,196 | A | | 1/1955 | Panhard |
| 2,736,404 | A | | 2/1956 | Clingman |
| 2,825,941 | A | | 3/1958 | Lux et al. |
| 2,837,782 | A | | 6/1958 | White |
| 2,910,209 | A | | 10/1959 | Nelson |
| 3,068,617 | A | | 12/1962 | Borski |
| 3,110,065 | A | | 11/1963 | Dennis |
| 3,159,884 | A | | 12/1964 | Hankey et al. |
| 3,213,584 | A | | 10/1965 | Bush |
| 3,251,399 | A | | 5/1966 | Grossman |
| 3,360,887 | A | | 1/1968 | Parks et al. |
| 3,363,390 | A | | 1/1968 | Jameson et al. |
| 3,416,279 | A | | 12/1968 | Dallen |
| 3,438,150 | A | | 4/1969 | Heim |
| 3,466,819 | A | | 9/1969 | Giger |
| 3,785,660 | A | | 1/1974 | Bush |
| 3,911,630 | A | | 10/1975 | Nally |
| 3,939,620 | A | | 2/1976 | Bero |
| 3,952,455 | A | | 4/1976 | McAlarney |
| 4,006,569 | A | | 2/1977 | Kain |
| 4,010,573 | A | | 3/1977 | Andrzejewski |
| 4,040,210 | A | | 8/1977 | Land |
| 4,042,741 | A | | 8/1977 | Bright |
| D247,047 | S | | 1/1978 | Damiana |
| 4,098,035 | A | | 7/1978 | Bessler |
| 4,103,459 | A | | 8/1978 | Barnerias et al. |
| 4,134,240 | A | | 1/1979 | Bologna et al. |
| 4,255,903 | A | | 3/1981 | Reynolds et al. |
| 4,255,907 | A | | 3/1981 | Lightell |
| 4,272,942 | A | | 6/1981 | Jackson |
| 4,341,255 | A | * | 7/1982 | Mock ........................ E60B 3/28 160/368.1 |
| 4,355,448 | A | | 10/1982 | Ezaki |
| 4,364,209 | A | | 12/1982 | Gebhard |
| 4,377,055 | A | | 3/1983 | Frederick |
| 4,387,541 | A | | 6/1983 | Boomershine |
| 4,407,099 | A | | 10/1983 | McLaughlin |
| 4,411,941 | A | | 10/1983 | Azzola |
| 4,424,976 | A | | 1/1984 | Hayashi |
| 4,430,374 | A | | 2/1984 | Ezaki |
| 4,447,065 | A | | 5/1984 | Dupuy et al. |
| 4,450,660 | A | | 5/1984 | Dean et al. |
| 4,452,020 | A | * | 6/1984 | Werner ..................... E06B 3/28 49/62 |
| 4,453,855 | A | | 6/1984 | Richter et al. |
| 4,473,980 | A | | 10/1984 | Foster |
| 4,477,507 | A | | 10/1984 | Kunert |
| 4,486,990 | A | | 12/1984 | Bauch |
| 4,592,180 | A | | 6/1986 | Gerritsen |
| 4,599,825 | A | | 7/1986 | Sixsmith |
| 4,668,556 | A | | 5/1987 | Hermann et al. |
| 4,682,443 | A | | 7/1987 | Demo |
| 4,703,598 | A | | 11/1987 | Wilson et al. |
| 4,706,729 | A | | 11/1987 | Sixsmith |
| 4,738,482 | A | * | 4/1988 | Bohm ...................... B60J 10/12 296/201 |
| 4,787,668 | A | | 11/1988 | Kawase et al. |
| 4,835,927 | A | | 6/1989 | Michlovic |
| 4,869,945 | A | | 9/1989 | Harney |
| 4,891,913 | A | | 1/1990 | Shimura et al. |
| 4,946,174 | A | | 8/1990 | Usui |
| 4,949,524 | A | | 8/1990 | Martin |
| 5,009,947 | A | | 4/1991 | McManus et al. |
| 5,011,163 | A | | 4/1991 | Hermann et al. |
| 5,077,945 | A | | 1/1992 | Koeniger |
| 5,095,658 | A | * | 3/1992 | Anderhalden ........ E06B 7/2309 49/479.1 |
| 5,107,646 | A | | 4/1992 | Tamura |
| 5,131,194 | A | | 7/1992 | Anderson |
| 5,143,666 | A | | 9/1992 | McManus et al. |
| 5,209,498 | A | | 5/1993 | Colin |
| 5,305,552 | A | | 4/1994 | Guillon |
| 5,312,672 | A | | 5/1994 | Dittmeier et al. |
| 5,361,542 | A | | 11/1994 | Dettloff |
| 5,390,974 | A | | 2/1995 | Theodorakakos |
| 5,466,508 | A | | 11/1995 | Brocke et al. |
| 5,538,317 | A | | 7/1996 | Brocke et al. |
| 5,555,685 | A | | 9/1996 | Watanabe et al. |
| 5,566,954 | A | | 10/1996 | Hahn |
| 5,577,798 | A | * | 11/1996 | Ichinohe .................. B60J 10/12 296/216.09 |
| 5,581,951 | A | | 12/1996 | Ryan et al. |
| 5,735,089 | A | | 4/1998 | Smith et al. |
| 5,737,885 | A | | 4/1998 | Stoyke |
| 5,809,707 | A | | 9/1998 | Bargados et al. |
| 5,819,472 | A | | 10/1998 | Frost |
| 5,937,595 | A | | 8/1999 | Miller |
| 6,052,957 | A | | 4/2000 | Minnich |
| 6,116,615 | A | | 9/2000 | Trehan |
| 6,143,397 | A | * | 11/2000 | Kanehara ............. B60J 10/0031 428/122 |
| 6,152,523 | A | | 11/2000 | Schonebeck |
| 6,223,497 | B1 | | 5/2001 | Ohtake et al. |
| 6,460,300 | B2 | | 10/2002 | Mikkaichi et al. |
| 6,679,005 | B1 | * | 1/2004 | Cebulla ................. E06B 7/2309 49/475.1 |
| 6,684,574 | B2 | | 2/2004 | Hayashi |
| 6,730,258 | B1 | | 5/2004 | Ohtake et al. |
| 6,742,565 | B2 | | 6/2004 | Badley |
| 6,832,451 | B2 | * | 12/2004 | Yamashita ........... B60J 10/0031 296/216.09 |
| 6,865,850 | B1 | | 3/2005 | Campbell |
| 6,874,218 | B2 | * | 4/2005 | Hicks ................... B60J 10/0088 277/628 |
| 6,877,286 | B2 | | 4/2005 | Johnson |
| 6,893,084 | B2 | * | 5/2005 | Tamura ................ B60J 10/0031 296/216.09 |
| 6,922,945 | B2 | | 8/2005 | Dron |
| 6,945,540 | B2 | | 9/2005 | Bormann et al. |
| 7,219,899 | B2 | | 5/2007 | Kesseg |
| 7,228,662 | B1 | | 6/2007 | John |
| 7,481,030 | B2 | | 1/2009 | Grunst |
| 7,490,445 | B2 | | 2/2009 | Steffek et al. |
| 7,546,793 | B2 | | 6/2009 | LaSusa |
| 7,565,878 | B2 | * | 7/2009 | Shearer ................ B60J 10/0022 114/361 |
| 8,272,178 | B2 | | 9/2012 | Pardue et al. |
| 8,474,189 | B1 | * | 7/2013 | Peterson ............... E06B 7/2314 49/479.1 |
| 8,720,973 | B2 | * | 5/2014 | Sitterlet ............... B60J 10/0022 296/146.15 |
| 2003/0177701 | A1 | * | 9/2003 | Yamashita ........... B60J 10/0031 49/489.1 |
| 2005/0064135 | A1 | | 3/2005 | Perrin |
| 2006/0059820 | A1 | * | 3/2006 | Peterson ................... E06B 7/23 52/426 |
| 2007/0113482 | A1 | | 5/2007 | Dumke et al. |
| 2008/0100074 | A1 | * | 5/2008 | Shearer ................ B60J 10/0022 296/1.08 |
| 2009/0025317 | A1 | | 1/2009 | Wirz et al. |
| 2012/0079771 | A1 | | 4/2012 | Meulemans |
| 2012/0260579 | A1 | * | 10/2012 | DeMello ............... E06B 7/2309 49/477.1 |
| 2014/0338266 | A1 | * | 11/2014 | DeMello ............... E06B 7/2309 49/498.1 |
| 2014/0338267 | A1 | * | 11/2014 | DeMello ............... E06B 7/2309 49/498.1 |
| 2015/0246603 | A1 | * | 9/2015 | Silvestrino ............... B60J 10/02 296/93 |

FOREIGN PATENT DOCUMENTS

| | | |
|---|---|---|
| GB | 2129038 | 5/1984 |
| GB | 2464090 | 4/2010 |
| JP | 10334328 | 12/1998 |

* cited by examiner

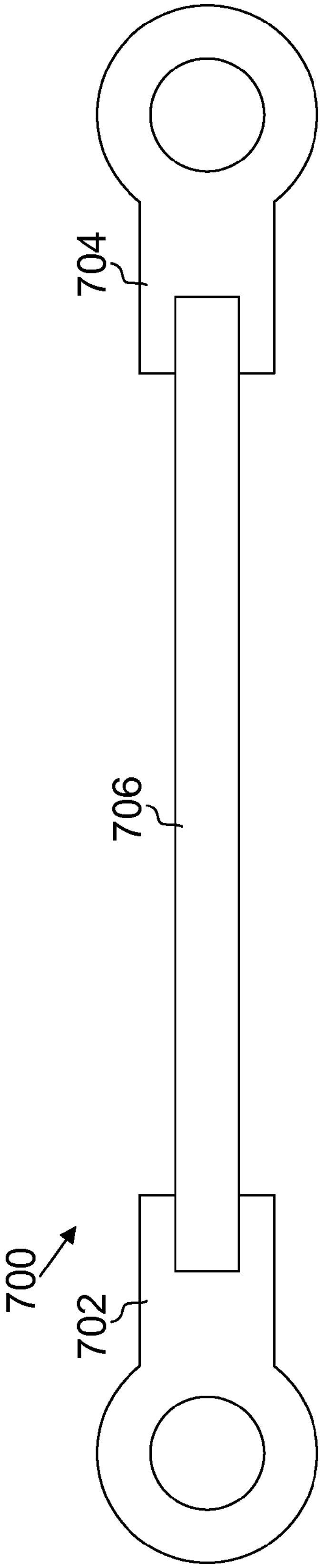
Fig. 7A Standard Shape Window
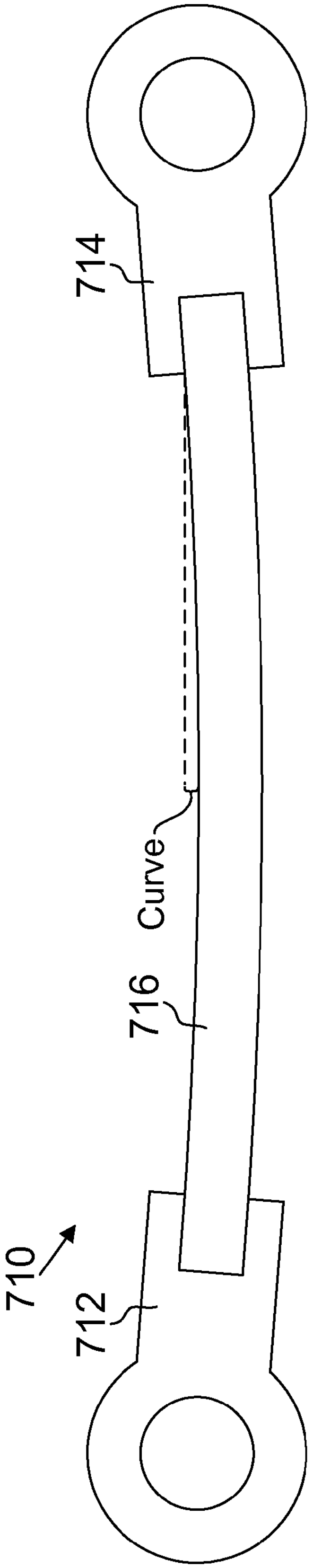
Fig. 7B Window Having Stiffening Relief Curve Venting Removal, stage 1

Removal, stage 2

PRESS FIT STORM WINDOW SYSTEM

RELATED APPLICATIONS

This patent application is a continuation-in-part of application Ser. No. 14/167,232, filed Jan. 29, 2014, which is a continuation-in-part of application Ser. No. 12/877,952, filed Sep. 8, 2010, which is a continuation-in-part application of application Ser. No. 12/573,174, filed Oct. 5, 2009. Each of those applications is incorporated in this patent application by this reference.

FIELD OF THE INVENTION

This disclosure relates generally to storm windows, and more particularly to a press fit storm window that may include a facility for controlling blowout events.

BACKGROUND

Storm windows are generally mounted on the outside or inside of main windows of a home or business. They are oftentimes used in cold climates to reduce energy leakage from the windows, for instance, cold air leaking into a house through the main windows. Storm windows may be mounted externally or internally, and are generally made from glass, plastic, or other transparent material. In some instances storm windows may be translucent or opaque.

A method of measuring efficiency of thermal insulation, which is the opposite of a rate of heat transfer, is R-Value. An R-value number indicates the relative resistance to heat flow, where a higher R-value has greater thermal efficiency. The R-value generally depends on the type and size of the insulation system being rated, for example the material selected, its size, thickness, and density. R-values of multi-layer systems equal the total of the individual layered systems.

Many present-day storm window systems are difficult to install and remove. Generally present-day storm window systems are mechanically attached with mounting hardware to either the inside or outside of the main window. The windows may be heavy and difficult to manipulate. Other, less expensive systems use see-through plastic sheets that are taped or attached to window casings. Sometimes the plastic sheets may be "shrunk" using a heat gun which, when directed at the plastic sheet, causes the sheet to contract, making the sheet taught, and easier to see through. Such prior art systems are, similar to the mechanical systems as described above, difficult and time-consuming to install.

Embodiments of the invention address these and other problems in the prior art.

BRIEF DESCRIPTION OF THE DRAWINGS

FIGS. 7A, 7B, 7C, and 7D are top cross-sectional view of a various storm windows according to embodiments of the invention.

DETAILED DESCRIPTION

Embodiments of the invention are directed to storm windows that may be easily and readily installed in a window frame of an existing window. A transparent portion of the window is generally see-through and may be made from glass, plastic, such as PLEXIGLASS, or other clear, generally rigid material. In other embodiments the window may be translucent, patterned, or opaque. A resilient material forming a resilient support surrounds the edges of the transparent portion, at least in part, such that, when the resilient material is compressed smaller than its natural state, it provides a "righting" or reformation force between the window frame and the transparent portion of the storm window. This reformation force of the resilient material puts pressure both on the window frame and the edge of the storm window and frictionally holds the storm window in place without the need for mounting hardware. The storm window may also include features for keeping it in place should outside forces act on the storm window system, such as a strong wind leaking through the main window, as described below.

Figure 1:
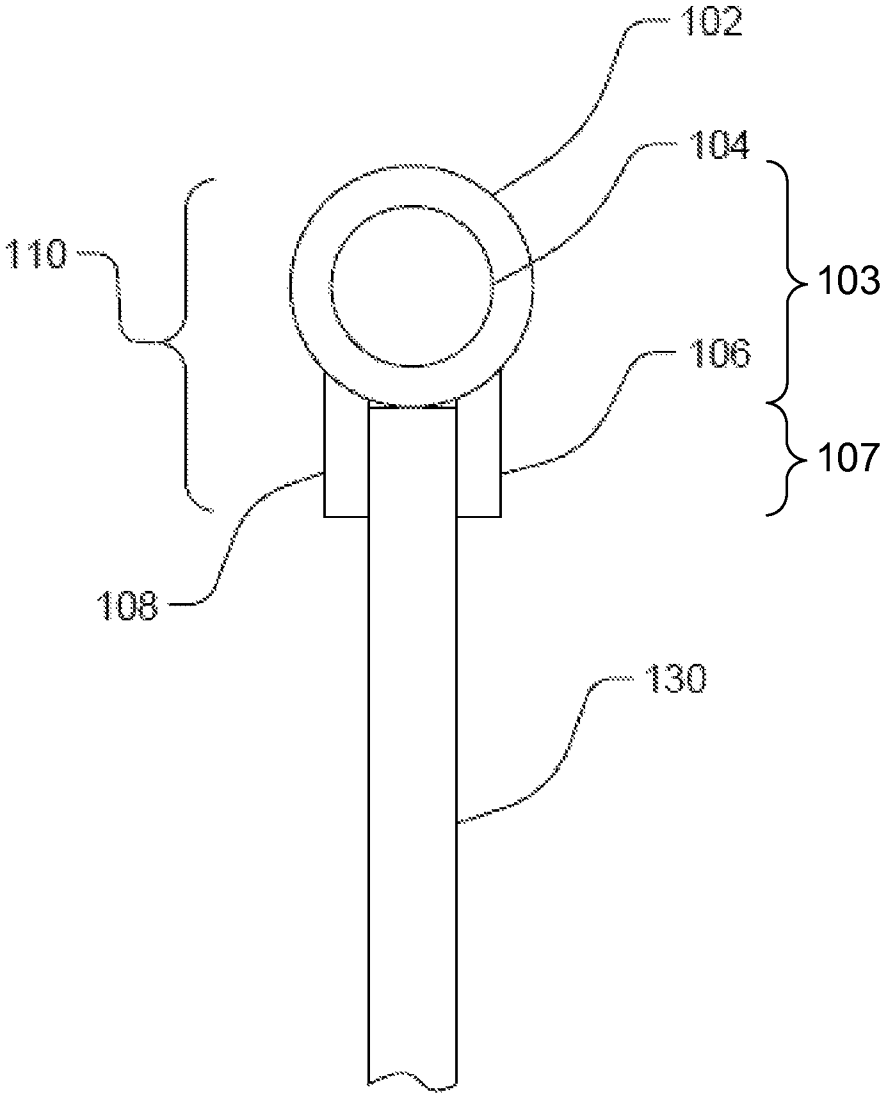
FIG. 1 is a side cutaway view of a portion of a storm window according to embodiments of the present invention.

FIG. 1 is a side cutaway view of a portion of a storm window according to embodiments of the present invention. A panel 130 is a rigid, transparent panel which serves as the "window" portion of the storm window. As described above, the panel 130 may be made from glass, plastic, such as PLEXIGLASS, or other suitable material. The thickness of the panel 130 is generally thin, such as ⅛," but other thickness panels may be used as well. In some embodiments the panel 130 may include decorative features, such as patterned translucent portions seen in privacy rooms, such as bathrooms. Other decorative features may include stained glass or material that appears to be stained glass. Still other decorative features may include decorative grill work such as iron grill work or material that appears to be such decorative grill work. In other embodiments the panel could be made of metal or wood. Although these embodiments would obviously not be transparent, such storm "windows" or coverings could be used for inside demolition operations where an easily insertable and removable window covering would be beneficial to protect the underlying window. Additionally, if light, sound, or thermal blocking properties were desired, the panel could be selected from an appropriate material without deviating from the scope of the invention.

A resilient support 110 generally includes a bulb portion 103 and a groove portion 107, and is positioned to generally surround at least a portion of the edge of the panel 130. In one embodiment, the resilient support 110 is mechanically held fast to the panel 130 by the "groove" 107 made from space between retaining portions 106, 108. The retaining portions 106, 108 are generally spaced so that they each contact a front or rear surface of the panel 130, thereby keeping the resilient support 110 in place and from moving relative to the panel. In other embodiments an adhesive may facilitate anchoring the resilient support 110 to the panel 130, at least in some portions of their contact. The retaining portions 106, 108 are generally sized to provide enough frictional force to securely hold the panel 130 surfaces. In one embodiment the retaining portions 106, 108 are ⅛" tall, but could vary between approximately 1⁄32" and approximately 2 inches, depending on the size and material selection of the panel 130. The width of the groove 107 is generally sized to exactly match the thickness of the panel 130, but may be slightly smaller or larger depending on the installation. In some embodiments adhesives could be used to adhere or attach the panel to the resilient support 110, with or without requiring the retaining portions 106, 108.

The bulb portion of the resilient support 110 may take one of several cross-sectional shapes. In FIG. 1, the cross section of the bulb portion 103 of the material making the resilient support 110 is circular, being formed from an outer surface 102 of the support 110 and a center "hole," the surface of which is indicated at 104. The cross section of the bulb portion 103 may take many shapes, as described below, and the "hole" may be partially or fully filled with additional resilient material, or another material, also as described in detail below.

The resilient support 110, as described above, is formed of a yieldable material that deflects or deforms under pressure and, based on its shape and material selection, provides a return reformation force, i.e., the force that the material exerts on the contact point or points of the object causing its deformation. As the resilient support 110 is further deformed, for instance pressing on the material of the support with a finger, the reformation force increases relative to the amount of deformation. In reverse, as the deformation force is reduced, the material of the resilient support 110 produces less and less reformation force until the material returns to its "natural," undeformed state, at which point the reformation force is zero.

In some embodiments the resilient support 110 is a single, uniform material, such as foam. In other embodiments the resilient support 110 is made from a combination of materials, such as a silicone cover or shell filled with a foam insert. The foam insert may be solid or may further include a cross sectional hole similar to the hole illustrated in FIG. 1. Other materials may also be introduced into the hole, whether or not covered by a silicone shell, such as metal, foam or plastic, shaped in various shapes, all of which together provide the resilient support 110 with the desired reformation force.

Embodiments of the invention may be produced from a large variety in materials, in various shapes and sizes. For instance the resilient support 110, as described above, may be made from foam, silicone, EPDM, or PVC, or derivatives, or any other material having the properties desired. Additionally, as mentioned above, the cross-sectional shape of the resilient material forming the resilient support 110 can be selected for the desired properties of the storm window. For instance the bulb of the resilient support 110 may be circular, oval, spiral, elliptical, square, triangular, or may have an "open" shape, such as L, U, V, or C. In either case, if there is a hole, such as the one illustrated at 104 of FIG. 1, another material or set of materials may fully or partially fill the hole to provide desired qualities of reformative force, resiliency, compression set (or compression memory), etc. Further, it may be the case that the materials used in the herein-described storm windows are subjected to large temperature variations and therefore should be selected to withstand the expected conditions, or to have their use limited only to conditions where the material properties will be satisfactory. Finally, because the storm windows will generally be exposed to the sun, they should be resistant to radiation, such as UV radiation.

Figure 2:
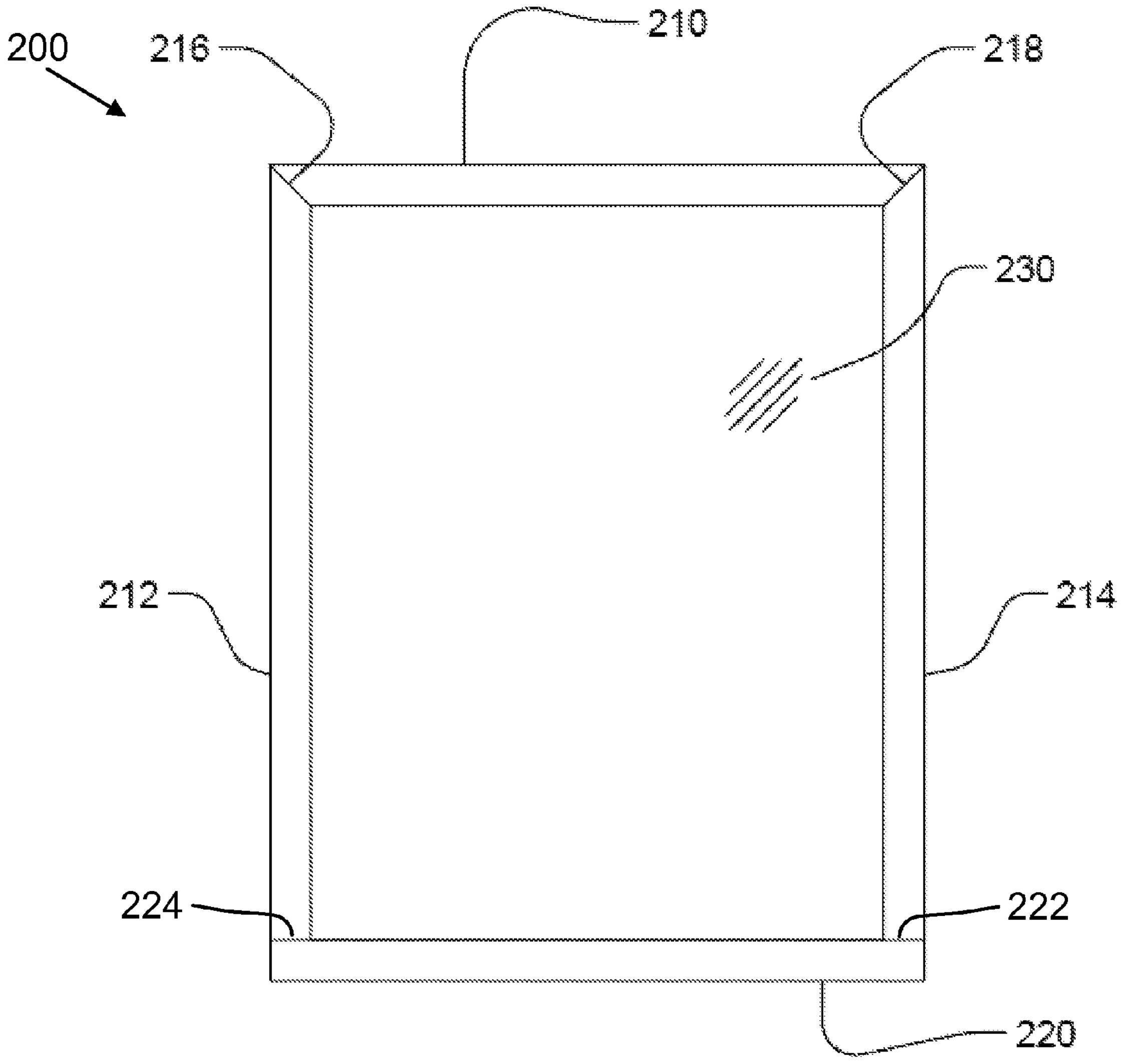
FIG. 2 is a front view of the storm window of FIG. 1.

FIG. 2 is a front view of a storm window 200 according to embodiments of the invention. The storm window 200 includes a panel 230 surrounded by sections 210, 212, 214, and 220 of the resilient support 110 described above with reference to FIG. 1. Individual sections of the resilient material may join with mitered corner joints, such as illustrated at 216, 218, or they may join with butt joints, as illustrated at 222, 224. Corner joints 216, 218 and butt joints 222, 224 may be sealed with thermal sealer or adhesive, or may be joined in other conventional methods. In some embodiments the bottom section 220 may be formed of a different material than the other sections 210, 212, 214 based on operational properties desired of the window 200, or based on other reasons. In one embodiment the bottom section 220 is formed of a rigid or semi-rigid material, such as aluminum, to stiffen the panel 230 and to prevent "droop." In other embodiments any of the sections 210, 212, 214, 220 may be formed of a different material, or have a different shape, or other properties, than the others. Also, although a rectangular window is illustrated in FIG. 2, as it is the most common window shape, embodiments of the invention work with storm windows of any shape.

Figure 3:
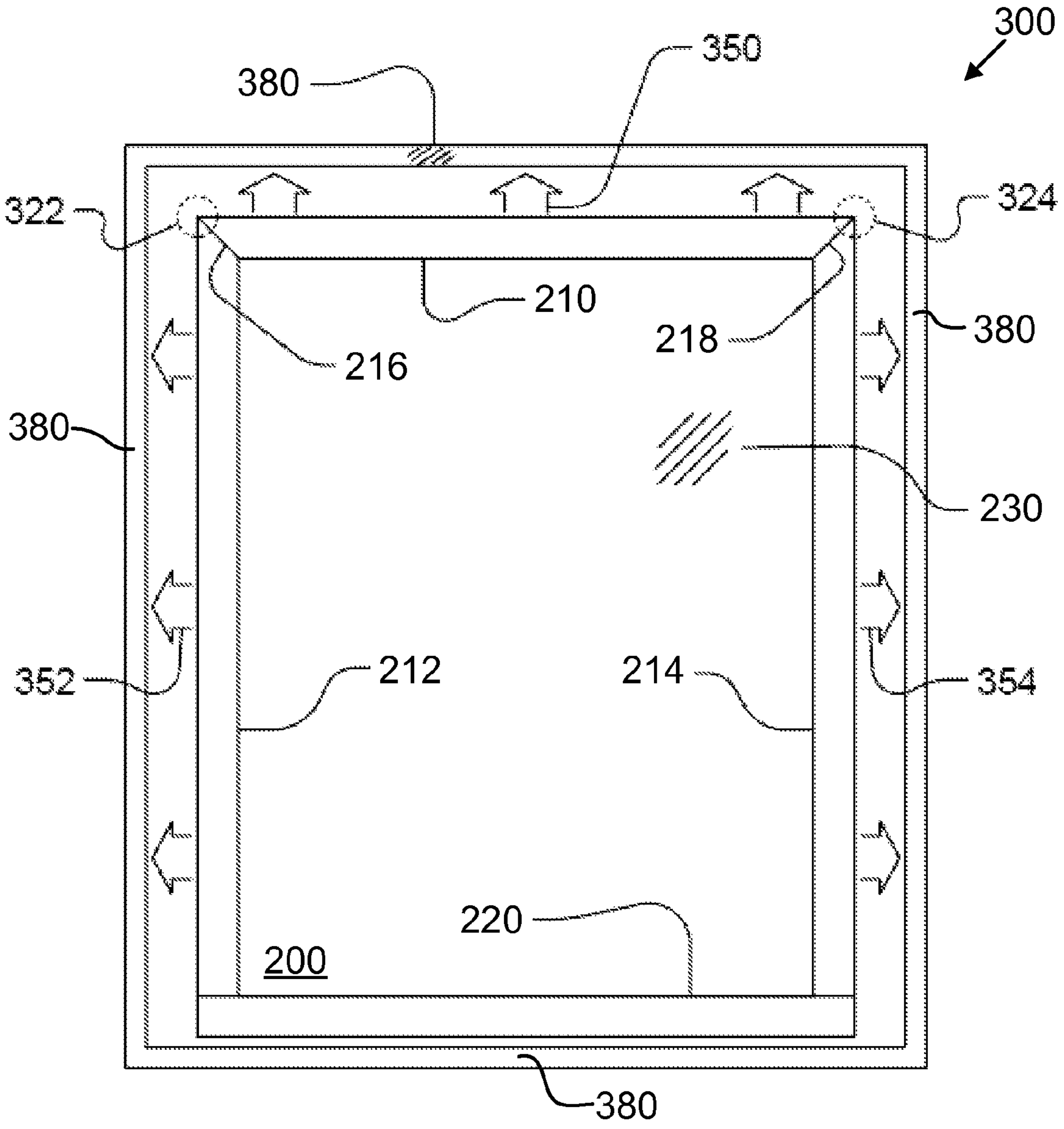
FIG. 3 is a diagram illustrating installation of the storm window of FIG. 1 inserted into a main window, according to embodiments of the invention.

FIG. 3 is a diagram illustrating installation of the storm window 200 of FIG. 2 inserted into a main window 300, according to embodiments of the invention. In installation, the storm window 200 is gently or forcefully inserted into a frame 380 of the main window 300. The size of the storm window 200 is selected such that the overall dimensions of the panel 230 plus the sections 210, 212, 214, and 220, when such sections are in their natural, non-deformed state, is larger than the frame 380 of the main window. Then, as the storm window is inserted, the sections 210, 212, 214, and 220 deflect or deform from their natural state, as described above. When set into a final position, the resilient support 110 (FIG. 1) making up the sections 210, 212, 214, and 220 remains in a continuously deformed state, by virtue of the selection of size of the storm window. Because the resilient material 110 is deformed, it produces the reformation force described above, between the edges of the panel 230 and the frame 380 of the main window 300. This reformation force, in conjunction with the frictional forces where the resilient support 110 meets the frame 380, keeps the storm window 200 in place. As described above, the resilient support 110 keeps the panel 230 in place by virtue of the groove 107 (FIG. 1).

Figure 4:
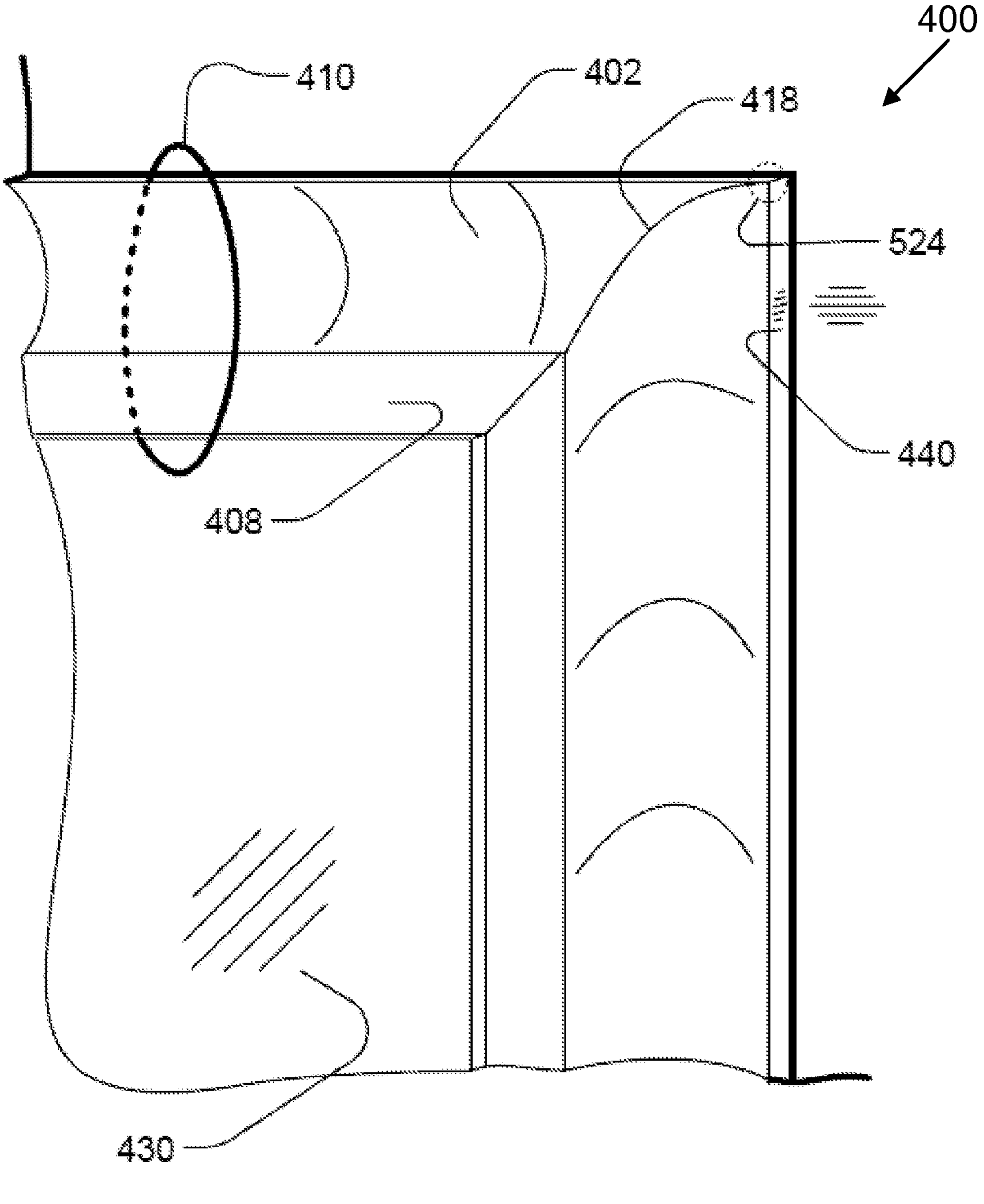
FIG. 4 is a detailed view of a corner portion of the storm window of FIG. 1, according to embodiments of the invention.
Figure 5:
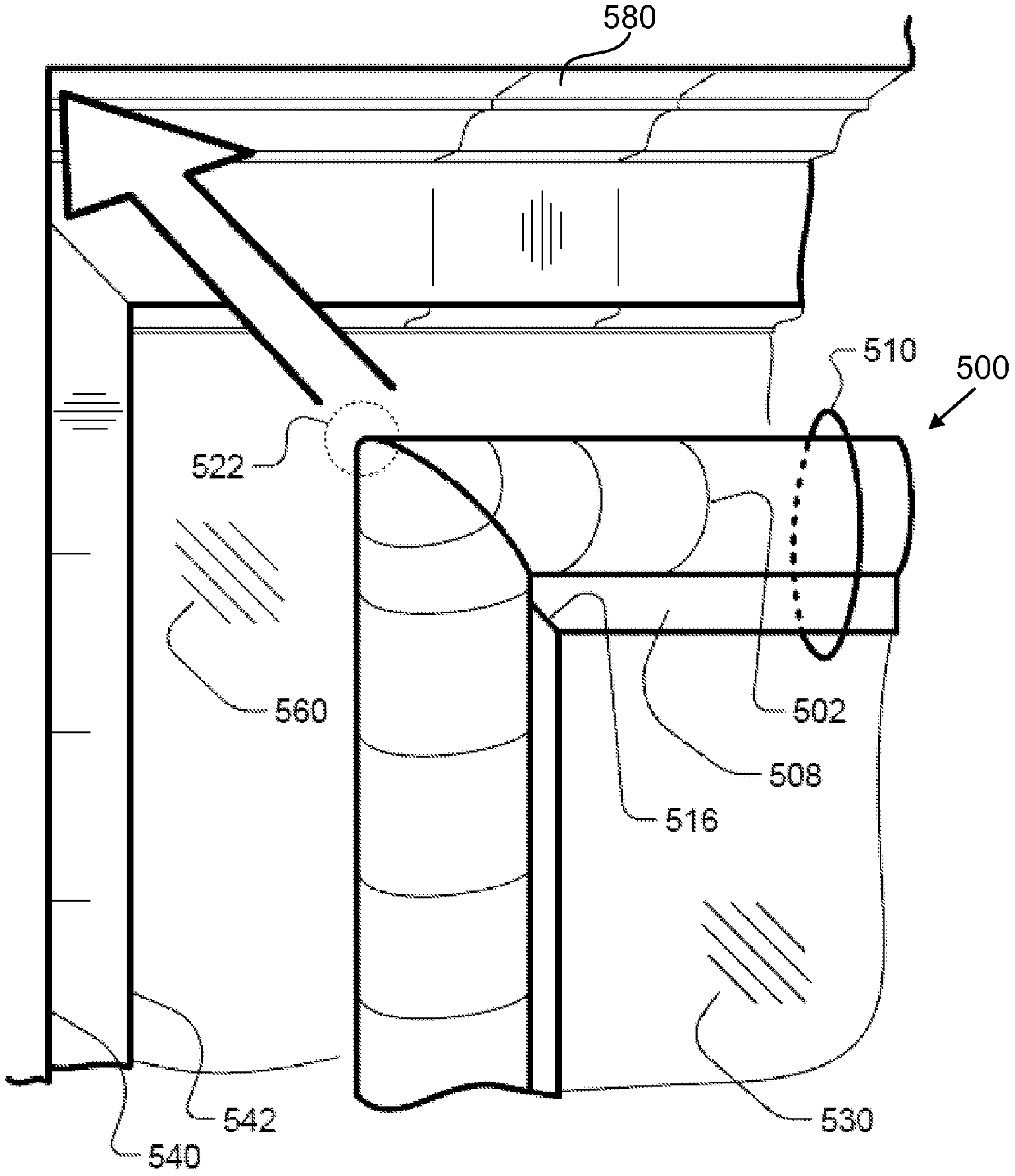
FIG. 5 is a detailed view illustrating installation of the storm window corner portion of FIG. 4, according to embodiments of the invention.

FIGS. 4 and 5 show additional detail of a corner section of a storm window 400, both before (FIG. 4) and during (FIG. 5) installation into a frame 580.

Figure 6A:
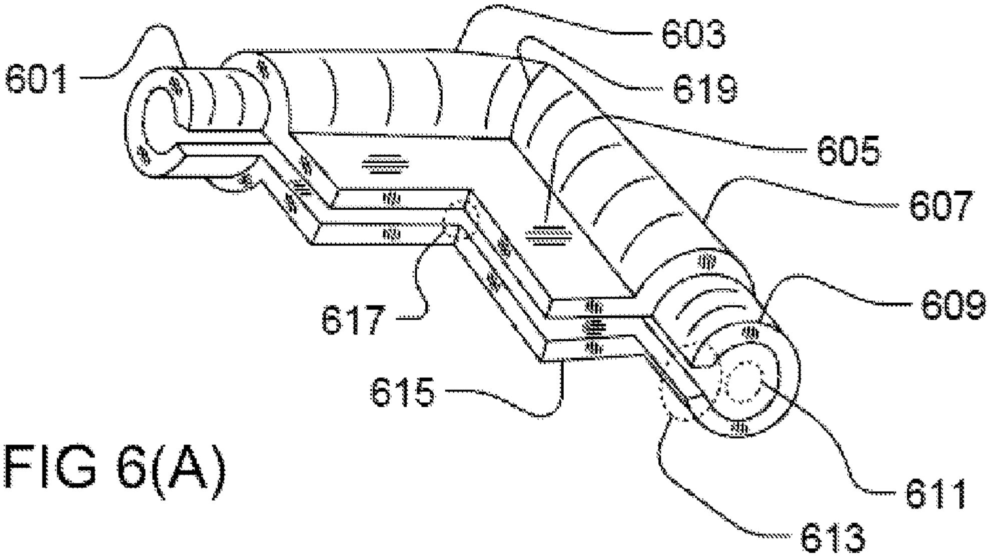
FIG. 6A is a perspective view of a corner portion of a storm window according to embodiments of the invention.

FIG. 6A is a perspective view of a corner portion of a storm window according to embodiments of the invention. In this embodiment a silicone cover 603, 607 may also include nipple sections 601, 609, which may be inserted in a mating receiving portion of a section of resilient material of a resilient support, such as sections 210, 212, 214, or 220 described above. In one embodiment the nipple portion 601, 609 is shaped such that, when inserted into the resilient support, that the outside surfaces of the receiving portion matches to the outside surface of the silicon cover 603, 607, to make a uniform appearance. In another embodiment the sections 601 and 609 illustrated in FIG. 6A are simply sections of the support having a diameter that matches the inside diameters of the silicone cover 605, 607, as well as the inside diameter of a section of the resilient support, thereby providing a joining surface that may be friction fit or otherwise fixed. A groove 617 is formed between retaining portions 605, 615, which is shaped to accept a panel (not illustrated in FIG. 6A). The cover pieces 603 and 607 join at a corner 619.

Figure 6B:
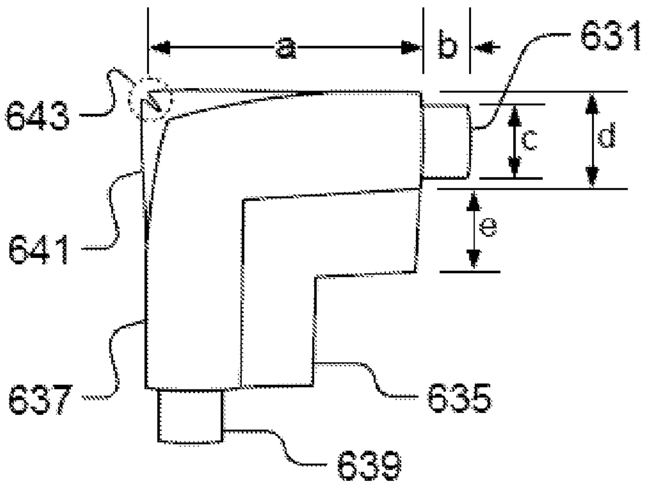
FIG. 6B is a front view of a corner portion of a storm window according to embodiments of the invention.
Figure 6C:
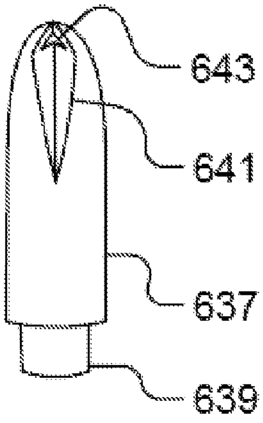
FIG. 6C is an edge view of the corner portion of FIG. 6B.

Further detail of the corner is illustrated in FIGS. 6A and 6B. In particular, a corner piece 637 may be formed of multiple pieces, such as in FIG. 6A, or may be made in a single-constructed piece. The corner piece 637 may include a "fin" 641, formed of a relatively thin piece of material, which may be the same or different material used to make the corner piece 637. The fin 641 is generally yieldable and more easily deformed than the corner piece 637 itself. The fin 641 may further include a notch 643, which allows the fin 641 to better deform in a corner of a window frame (not illustrated). In other words, without the notch 643, the fin 641 may "pucker," due to excess material, if placed into a tight corner. In embodiments that include the notch 643, less or no puckering occurs.

Also with respect to FIG. 6B, a curved corner is illustrated (excluding the fin 641) rather than a corner having straight lines. This feature of the design was included because, in many installations, the resilient material tends to bunch up and "buckle" in corners, due to so much material being present. Embodiments of the invention have sought to minimize the amount of material in the corners in a number of ways, such as the rounded corners as illustrated. In other embodiments the corner pieces do not form a 45 degree angle when not installed, and instead are separated by a pie-shaped gap between areas where the horizontal resilient material meets the vertical resilient material before being installed. When installed, the resilient material compresses to fill the corner with a minimum amount, or even no amount of gaps between the resilient material and the window frame.

With respect to dimensions illustrated in FIG. 6B, dimension "a" may extend from approximately ¼ to 3 inches, dimensions "b" and "c" may be 1/16"-4," depending on the installation, dimension "d" may be ⅓-4.5," and dimension "e" may be ⅛-2," again, depending on the size and material selection making the corner piece 637. These dimensions may vary from 10-500% depending on the particular details.

As described above, to install the storm window according to embodiments of the invention, first the storm window is sized according to the dimensions of the window frame in which the storm window is being installed. Next the storm window is inserted into the window frame in which a deformable, resilient material of the support is compressed during the insertion. After being placed and set in the window frame, the resilient material of the support exerts a reformation force between the window frame and the resilient support of the storm window. This reformation force coupled with frictional forces between the resilient support and the window frame, and to an extent, to the friction forces holding the panel in place by the resilient support, holds the storm window securely in place.

Although the above method works well for many windows, there are situations when outside forces can overcome the frictional and reformation forces of such a storm window set in a window frame. For instance, older windows were generally manufactured with much larger size tolerances and, combined with years or decades of use, may therefore include large air gaps. When forceful winds blow from outside the window through such air gaps they may create significant pressure on the storm window mounted inside, which generally forms an air-tight seal by virtue of its ring of resilient material of the support. Other actions can also cause pressure on the storm window, such as airflow caused by other windows in the home opening or closing, pressurizations or depressurizations due to airflow such as HVAC, or other motion due to humans or earthquakes, for example. As a result, the storm window may become unseated from the window frame. When the wind forces are light, the storm window may simply re-position itself within the window frame. When wind forces are strong, however, the storm window may be blown completely out of the window frame, which could fall into the house and cause damage or injury. In any event, if the storm window is unseated by wind or other forces, it is generally no longer seated correctly in the window, such that wind may enter the house, which may significantly reduce the insulation value of the storm window.

FIG. 7A is a top cross-sectional view of a storm window 700 according to embodiments of the invention described above. For example, a panel 706 is held in place by side resilient support sections 702, 704. For clarity, a resilient support section that would otherwise cover the top edge of the panel 706 is omitted. Other than to note that the panel 706 is planar, description of the storm window 700 is omitted for brevity, and can be found above.

FIG. 7B is a top cross-sectional view of a storm window 710 that in many respects is identical to the storm window 700 of FIG. 7A. Importantly, a panel 716 in the storm window 710 is formed with a pre-determined curve along its entire the top edge. The bottom edge (not illustrated) may be similarly curved, which gives the panel 716, overall, a partial-cylinder shape, and thereby creating a relatively stiff construction of the panel. Such a panel 716 is very resistant to bending, under force, across its vertical axis, while it would be more inclined to deflect across its horizontal axis. Using the bended shape of the panel 716 in a storm window such as described above generally creates a more rigid, stronger constructed window that may be able to withstand more force with less material than a conventional storm window having a flat panel, such as the panel 706 described in FIG. 7A. Of course, in other situations it may be preferable that, instead of having a curve along the top and bottom edges, that the curve instead be made across side edges, giving a partial-cylinder shape and resistance to bending across its horizontal axis.

Figure 7C:
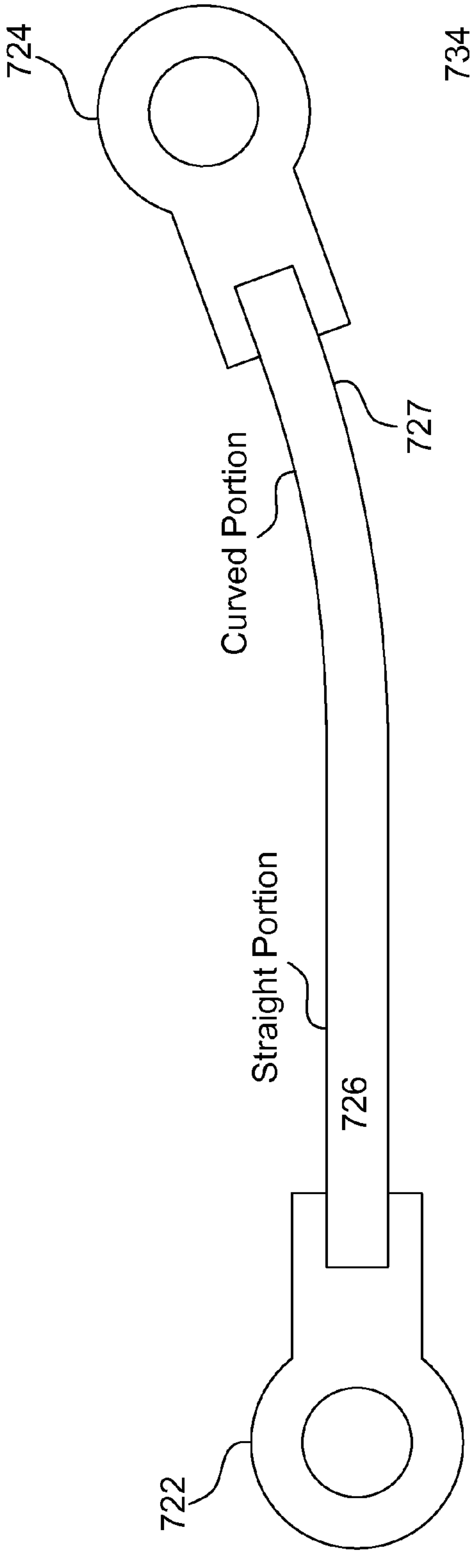
Figure 7D:
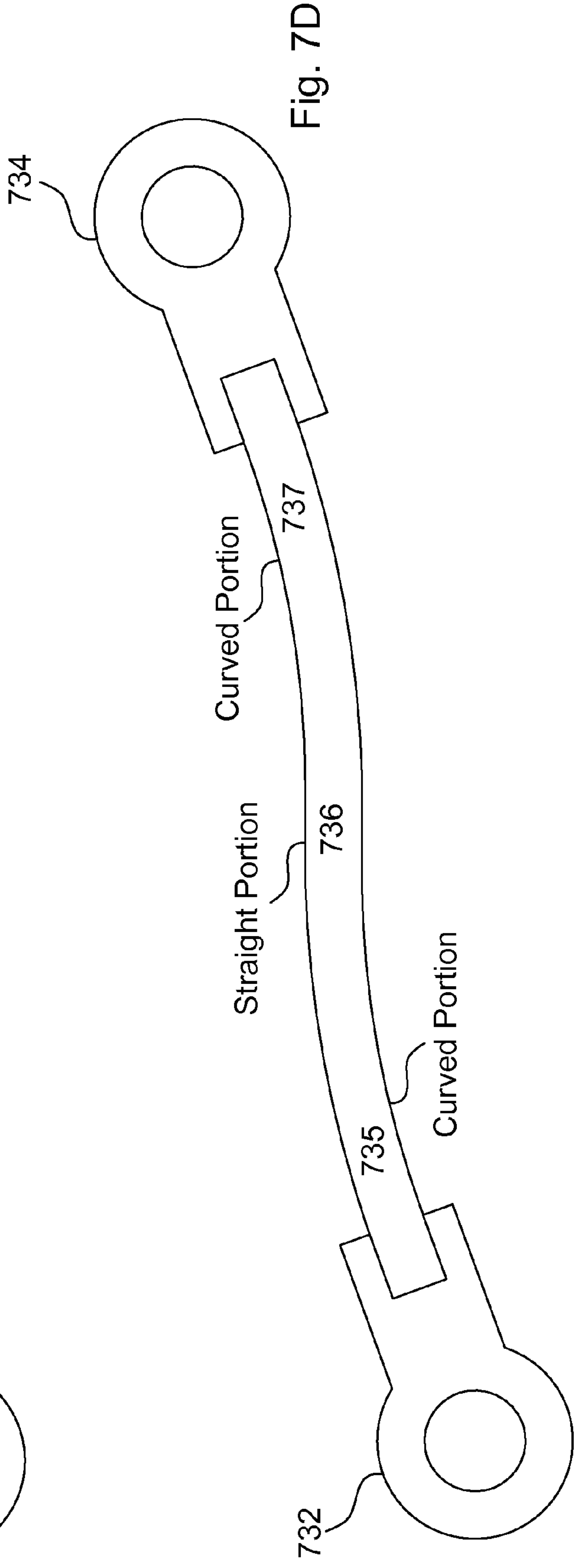

FIG. 7C is a top cross-sectional view of a storm window 720, which is similar to the storm window 710 described above. Different from the storm window 710, the storm window 720 is constructed of a panel having a generally straight portion 726 and a generally curved portion 727. Similarly, FIG. 7D is a top cross-sectional view of a storm window 730 that includes two curved portions, 735, 737, curved in opposite directions, and having a relatively straight portion 736 therebetween. Various uses of storm windows having curved sections are described below with reference to FIGS. 8A and 8B.

With respect to all of the illustrations 7A, 7B, 7C, and 7D, what is referred to as "top" may as well be referred to as "side," depending on which orientation the storm window is inserted into the window frame, as described in detail below.

Figure 8B:
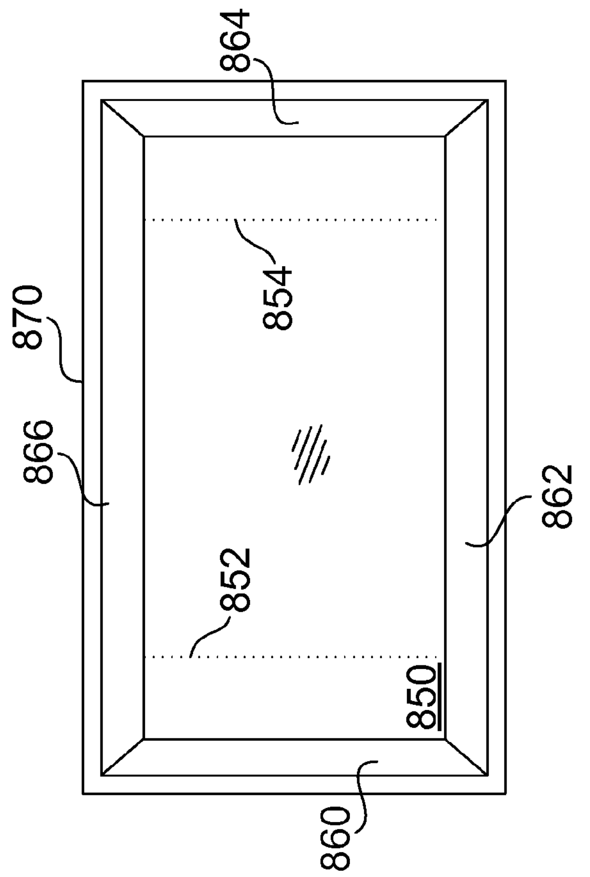
FIG. 8B is a front view of a storm window according to FIG. 7C or 7D mounted into a horizontal window frame according to embodiments of the invention.
Figure 8A:
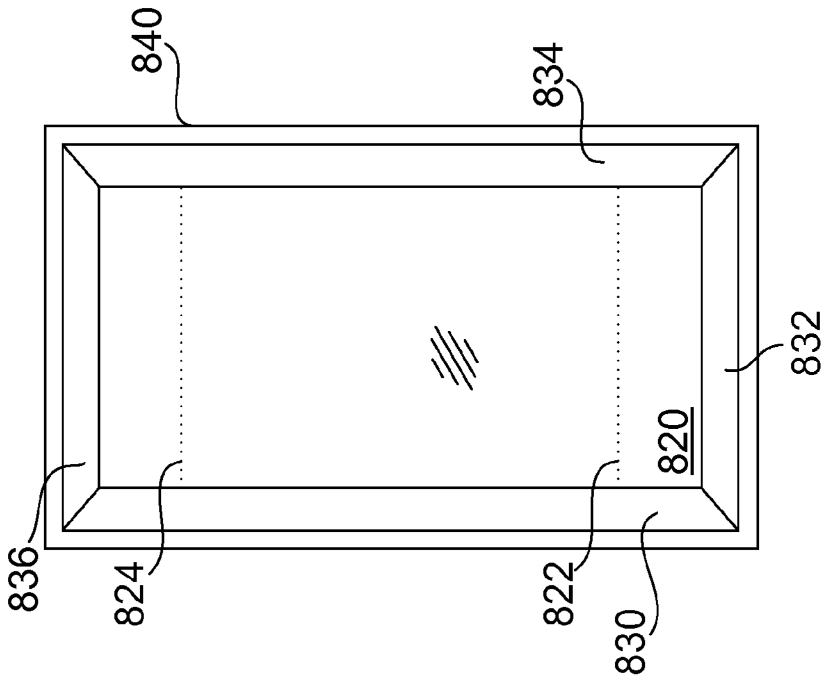
FIG. 8A is a front view of a storm window according to FIG. 7C or 7D mounted into a vertical window frame according to embodiments of the invention.

FIG. 8A is a front view of a storm window 820 having two curve points, 822 and 824. The curve points 822, 824 are similar to the areas of curvature illustrated with reference to FIG. 7D above. The storm window 820 is illustrated as being mounted within a window frame 840, and being held in place by resilient sections 830, 832, 834, and 836 as described above. The curvatures in the panel of the storm window 820 marked by the curve points 822 and 824 are in opposite directions, though not illustrated in FIG. 8A. The portion of the panel above the curve point 824, near the top of the window frame 840, is curved inward, toward the inside of a house Similarly, the portion of the panel below the curve point 822 is curved outward, toward the outside of the house.

Such a construction and installation of the storm window 820 of FIG. 8A within the window frame 840 provides a number of advantages, the most important of which is a controlled blowout feature. When wind pressure builds from outside the window and presses through the outside window to apply pressure to the storm window 820, the storm window is mostly likely to release pressure by the top portion of the window 820 moving toward the inside of the house, while the bottom portion and side portions remain relatively stationary. This happens because the curvature of the panel along the horizontal dimension, at the curve points 822, 824, stiffens the panel of the storm window 820 along its horizontal plane. At the same time, the vertical dimension has no additional stiffening measures, therefore, under a force from blowing wind, it is more likely that either the top or bottom edges 836, 832 of the window illustrated in FIG. 8A fails before the side edges 830, 834. Recall, however, that the portion of the panel 820 above the curve point 824 is already curved inward, toward the house, while the portion of the panel below the curve point 826 is curved outward. This configuration makes the top edge 836 of the storm window 820 more likely to move under pressure than the bottom edge 832. It is desirable to force a top edge of a storm window to release before the bottom edge of a window for a number of reasons. First, many people store household items along the bottom edge of a window because the bottom window frame generally provides a flat, wide, horizontal surface. Encouraging the bottom portion of a storm window to release before a top portion could cause the storm window to knock such items from the window frame ledge and cause damage to the items or force the homeowner to reposition the items on the ledge. Conversely, the top edge of a window frame provides no such ledge for household items and it would be unlikely that a controlled release at the top edge would cause damage.

FIG. 8B is similar in many respects to FIG. 8A, however the window in the window frame 870 covered by storm window 850 is a horizontal window, rather than a vertical window in FIG. 8A. In such an installation the storm window 850 may include only one curve point 852 or two curve points 852, 854. Differently from the vertical installation referred to in FIG. 8A, if the storm window 850 of FIG. 8B, includes both curve points 852, 854, both of the sections of the storm window beyond the curve points may bend inward toward the house. Regardless of the number and direction of curve points of the windows illustrated in FIGS. 8A and 8B, the windows can be installed in either a horizontal or vertical orientation.

Figure 9C:
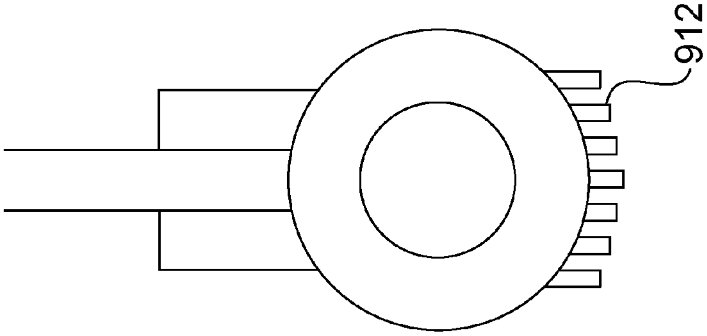
FIGS. 9A, 9B, and 9C are cross-sectional diagrams of resilient support sections according to embodiments of the invention.
Figure 9B:
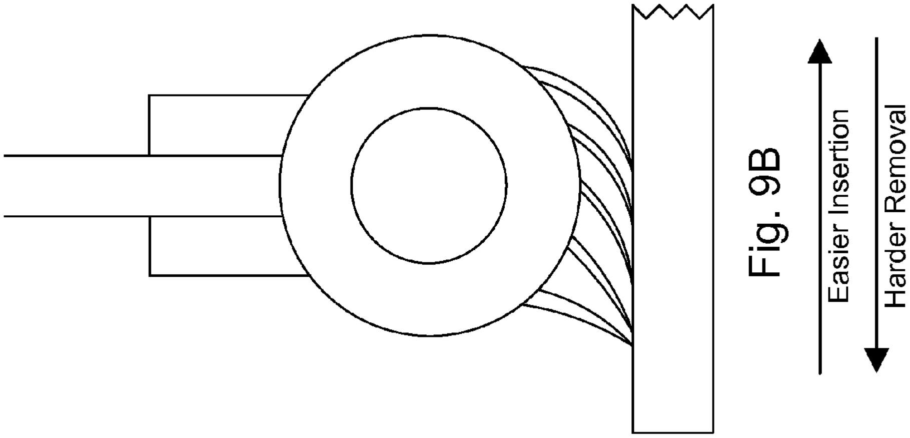
Figure 9A:
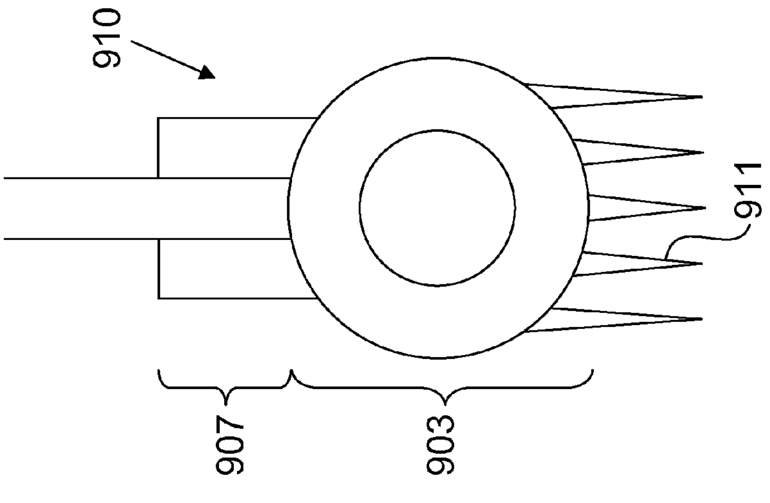

FIG. 9A illustrates another system for pre-disposing one or more portions of a storm window to release from its set position in a window frame before other portions. Similar to the resilient support illustrated in FIG. 1, a resilient support section 910 includes a bulb portion 903 and a groove portion 907. Differently, though, in this embodiment is that the resilient support section 910 includes a series of friction ribs 911 coupled to the bulb portion 903. The friction ribs 911 may be made from the same material as the resilient support section 910 or may be made from another material. If made from another material, the friction ribs 911 are attached to the resilient support section 910 by appropriate methods, such as adhesive or thermal welding.

The friction ribs 911 may be designed so that they provide more frictional force in one direction than another. For instance, with reference to FIG. 9B, it is easier to insert the resilient support section into the window frame, such as during installation, than removing it from the window frame, such as during a wind event. This increased frictional force is due to the shape and positioning of the friction ribs 911. In some embodiments the friction ribs 911 may be relatively long and thin, or, with reference to FIG. 9C, the friction ribs 912 may be relatively large and relatively "chunky." In either case the ribs 911, 912 may be angled in a certain direction relative to a vertical plane of the resilient support section 910. This angling, along with the physical structure of the ribs 911, 912 causes the friction difference depending on direction of movement of the resilient support section 910. Other designs of friction ribs are described below with reference to FIGS. 16A-16C.

Instead of adding friction ribs to the resilient material making up the support, there are other methods of varying the force at which the resilient support holds a section of storm window in place. For instance, recall from above that the bulb portion of a resilient support section, for example the bulb portion 103 in FIG. 1 can take any shape, and need not be circular in cross section. Further recall that the hole illustrated in FIG. 1 may be filled with material that may change the reformation force of the resilient support sections. Changes in shape, thickness, material selection and the presence or absence of holes, for instance, in the resilient support can change the reformation force of the resilient support when it is holding a storm window in place.

Figure 10:
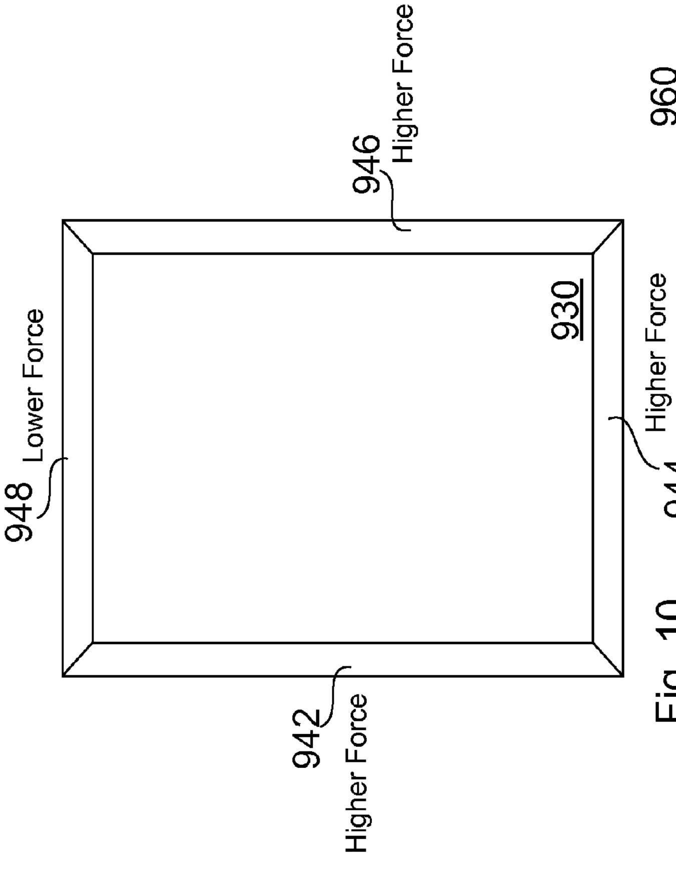
FIG. 10 is a front view of a storm window illustrating choices made when determining a controlled blowout according to embodiments of the invention.

Therefore, selection and control of the properties that affect how much restoration force is being applied by the resilient support in the installed storm window can be used to control how the storm window performs during a wind event. For instance, the hole in the resilient support on the sides of a storm window installation may be filled with a material that has more restorative force than that the material filling the hole in the resilient support attached to the top and bottom of the storm window. In effect, then, the sides of such a storm window are held more firmly to the window frame than the top and bottom. In such a system, during a wind event, the top or bottom are more likely to release than either side, thereby giving a system of controlled blowout. A similar system is illustrated in FIG. 10, in which the top portion 948 of a storm window 930 has a lower resilient force when installed in a window frame than the bottom portion 944 or side portions 942, 946. Various foams or other fillers used inside the hole of the resilient support may have different "compression set" values, which is the percent of original size a material will be restored to after deformation. Therefore, choosing materials having different compression set values to fill the hole in the resilient support allows the designer or builder choices for a material suitable for the particular installation.

Similar considerations can be made in other embodiments. For example, a resilient support having ribs 911 or 912 of FIG. 9A or 9B may be employed in only those portions of the storm window where extra friction is desired. In such a system, the resilient support that does not include such friction enhancing measures will likely be the first to release in a wind event. In yet another embodiment, the size of the panel itself may be chosen relative to how strongly different portions of the storm window are desired to be held in a window frame. For instance, the width of the storm window, as a percentage of a size of the main window, may be different than the percentage size of the height of the main window. When installed, the resilient support along the sides of such a storm window will be compressed more than the top or bottom, and the resulting storm window will be more strongly held along the sides than at the bottom or top.

Figure 11A:
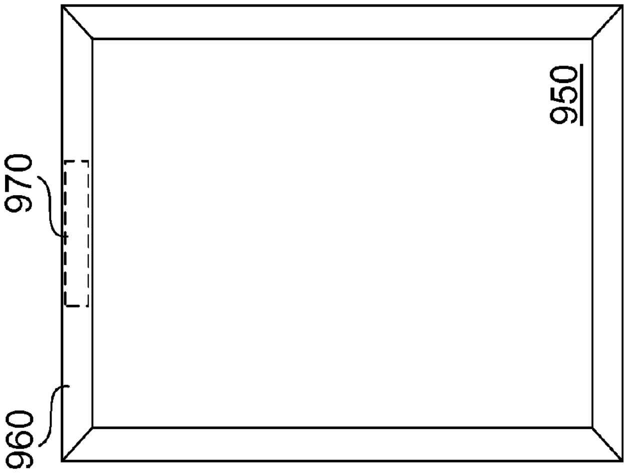
FIGS. 11A, 11B, and 11C are diagrams illustrating a venting system in a storm window according to embodiments of the invention.
Figure 11C:
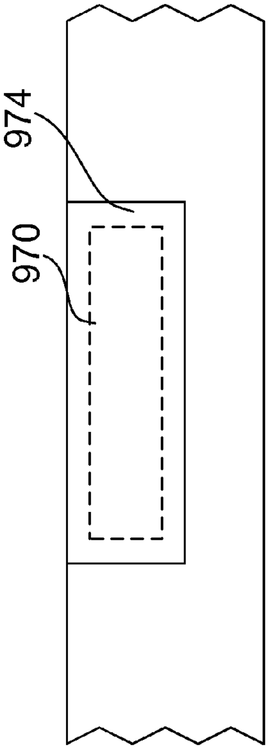
Figure 11B:
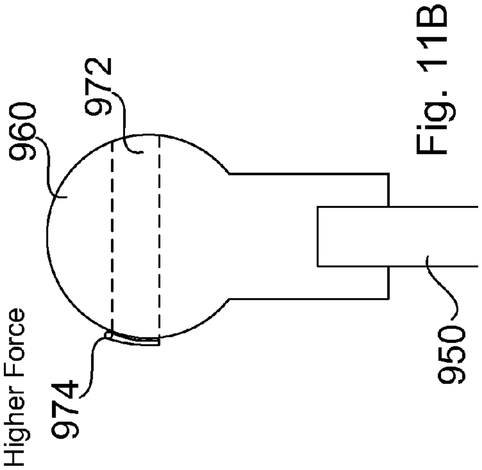

FIG. 11A illustrates a relief vent 970 through an area of a resilient support 960 in a storm window 950. Details are illustrated in FIGS. 11B and 11C. FIG. 11B is a side cross sectional view of the resilient support 960 of FIG. 11A. A relief vent hole 972 may be laser drilled or otherwise formed through the material making up the resilient support, providing a portal through which air pressure could pass from one side of the resilient support 960, for instance the side facing the main window, into the room. Of course the relief vent hole would have to be sized such that they provide such an air passage even when the resilient support 960 is compressed. An optional one-way flap 974 would prevent air from the house being forced in the other direction. Other variations of this concept are also possible. The size of the relief vent 970 may be modified to suit the anticipated amount of volume of wind to be vented. Additionally, multiple relief vents 970 may be included within the resilient support 960 and spaced out around the window 950 to allow an adequate volume of air to escape during a wind event.

Figure 12A:
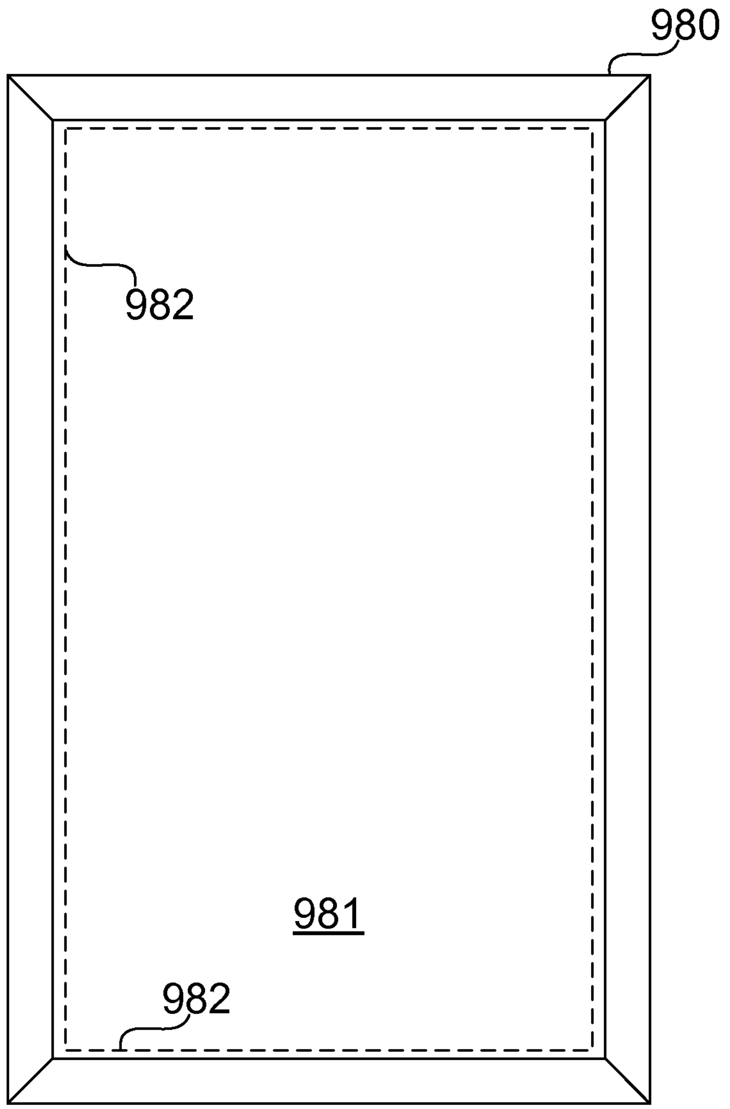
FIGS. 12A, 12B, 12C, 12D, and 12E are diagrams illustrating another venting system in a storm window according to embodiments of the invention.
Figure 12B:
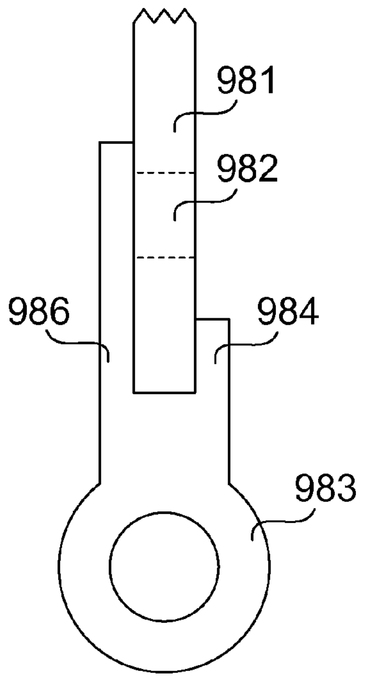
Figure 12C:
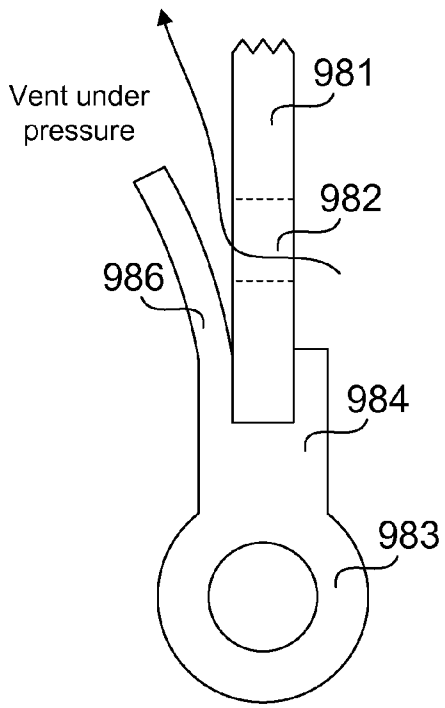
Figure 12D:
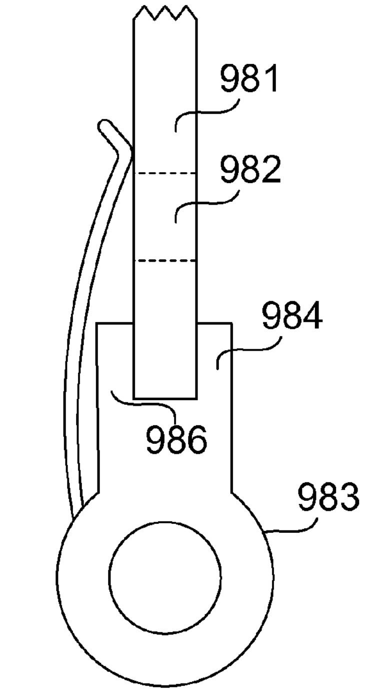
Figure 12E:
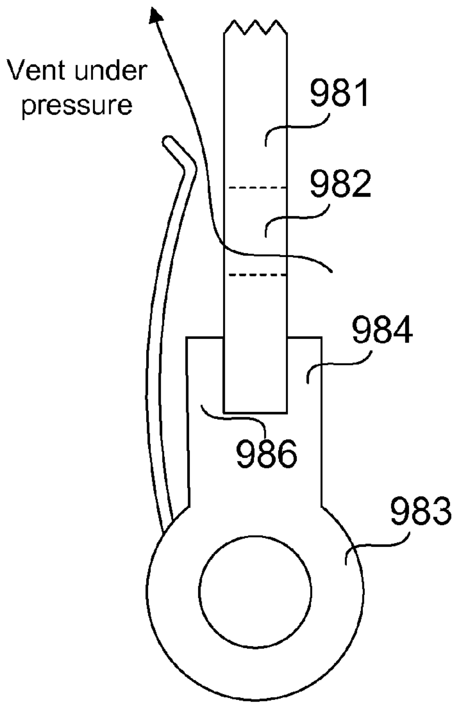

FIGS. 12A-12D illustrate another embodiment of a vent for storm windows according to embodiments of the invention. In these figures, a storm window 980 having a panel 981 includes a series of openings or perforations 982 formed through the panel. As illustrated on FIG. 12B, the panel 981 is held in place in a groove formed by two retaining portions, 984, 986 in a section of resilient support 983, as described above. In this embodiment, however, the retaining portions 984, 986 are sized differently; in particular, one of the retaining portions is longer than the other. In this configuration the longer retaining portion 986, operates as a one-way flap that opens when sufficient pressure builds behind it. Eventually the retaining portion 986 yields under the pressure, as illustrated in FIG. 12C, and the air pressure, i.e., wind, vents through the perforation 982 and past the retaining portion 986 into the open room. Although this embodiment is illustrated with a retaining portion 986 operating as a flap or valve, additional or different valves or other structures could be used in conjunction with the perforations 982, or other perforations through the window 980. For instance, a magnetic or spring seal or specific one-way valve could allow pressure to escape from behind the window 980, then re-seal when the pressure subsides. A similar concept is illustrated in FIG. 12D, except that, instead of differently sized retaining portions, as in the illustrated embodiments above, retaining portion 984 is the same size as retaining portion 986. An additional pressure relief tab 988 is instead additionally coupled to the section of resilient support 983. Similar to the embodiment illustrated in FIG. 12C, when wind pressure builds behind the storm window 980, the pressure relief tab 988 yields to allow air to escape into the room through the perforation 982.

Figure 13:
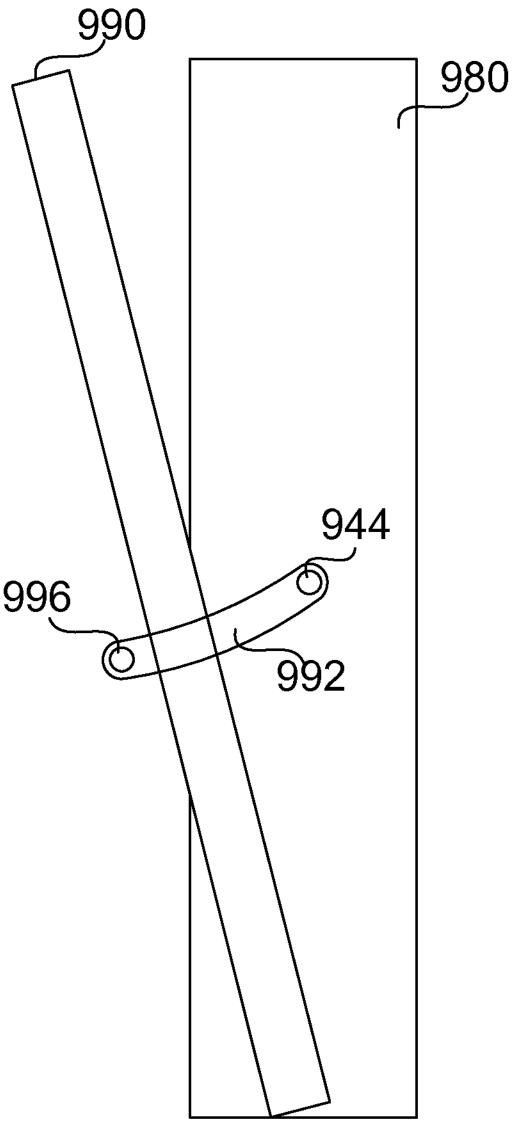
FIG. 13 is side view of a storm window retention mechanism according to embodiments of the invention.

FIG. 13 is a side view of a storm window 990, similar to the one described above with reference to FIG. 2, which further includes a retention strap 992 structured to hold the storm window in place should all of the blowout control mechanism described herein fail and a wind event would otherwise cause the window to separate completely from a window frame 980. In this figure the strap 992 includes a connection mechanism 994, such as a snap, which connects to the window frame 980. Of course other connection types could be used, such as hook and loop, direct attachment, etc. Similarly the strap 992 includes a connection mechanism 996 that is connectable to the window 990. In practice an installer would set a bottom of the storm window 990 into the bottom of the window frame, then attach the retention strap 992 to the window frame 980 as well as the storm window 990. The resilient support, not specifically shown in FIG. 12, has enough "give" such that the retention strap can pass between the material and the side of the window frame 980. Of course similar retention mechanisms such as springs, etc. could be used to retain the storm window 990. In the case of a spring retention device, a spring return force could also be used to partially support the storm window in the window frame 980.

Figure 14A:
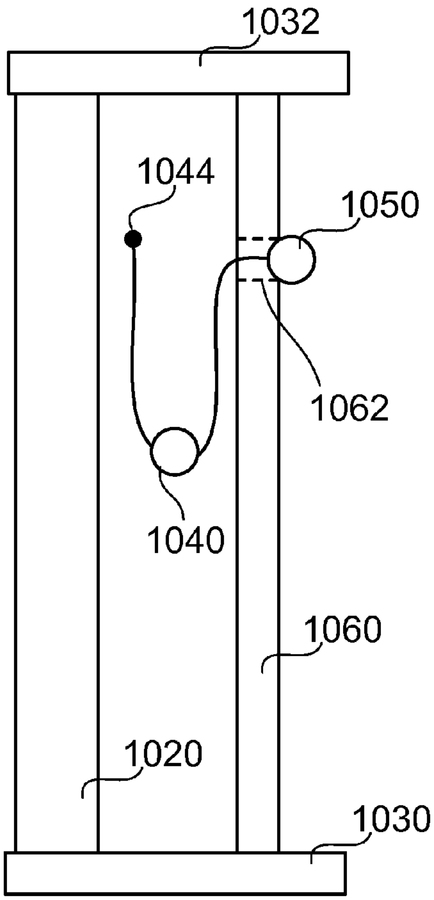
FIGS. 14A, 14B, 14C, and 14D are diagrams illustrating yet another venting system in a storm window according to embodiments of the invention that additionally provide an integrated removal mechanism.

FIGS. 14A-14D illustrate yet another venting system in a storm window according to embodiments of the invention that additionally provide an integrated removal mechanism. In FIG. 14A, an outside window 1020 is mounted between a bottom window frame 1030 and top window frame 1032. A press-fit storm window 1060 is set in the window frame, providing storm window coverage for the outside window 1020.

Within the panel or glazing of the storm window 1060 is a channel, or hole 1062, through which a string, chain, or other flexible tether passes and is attached to a side of the window frame at an attachment 1044. Coupled to the string are two objects, such as balls 1040, 1050. In some embodiments the balls 1040, 1050 have different weights, and the ball 1040, stationed between the outside window 1020 and the storm window 1060 is the heavier ball. In other embodiments the balls 1040, 1050 have the same or nearly the same weights. In some embodiments an amount of string or chain that is located between the outside window 1020 and storm window 1060 is longer than the amount of chain outside the storm window, and this difference in weight pulls the ball 1050 toward the window 1060 based on the weight of the chain.

Figure 14B:
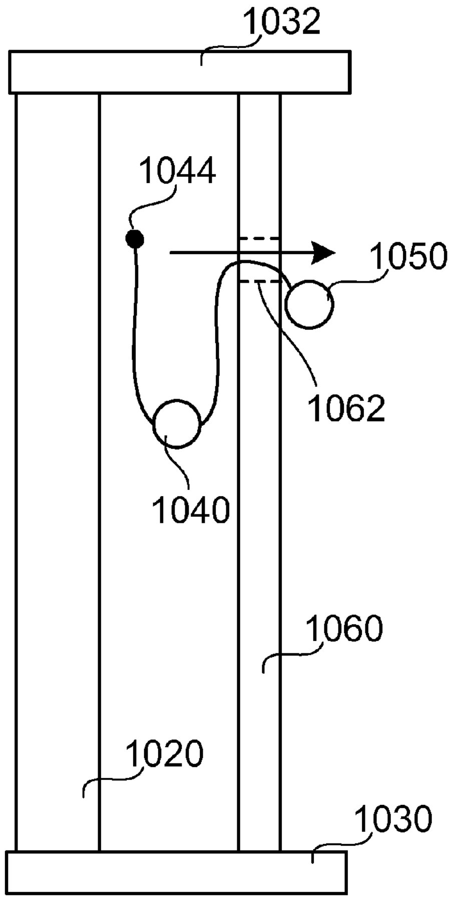

During the majority of time, the window will appear as it does in FIG. 14A, meaning that the heavier ball 1040, due to gravitational force, pulls the string so that the lighter ball 1050 rests near or against the panel 1060, and specifically near the hole 1062. During a wind event, as illustrated in FIG. 14B, the wind pressure builds in the space between the outside window 1020 and storm window 1060. The wind pressure builds until it dislodges the lighter ball 1050 from its resting position, giving the wind an avenue to vent through the hole 1062, and into the room.

Figure 14C:
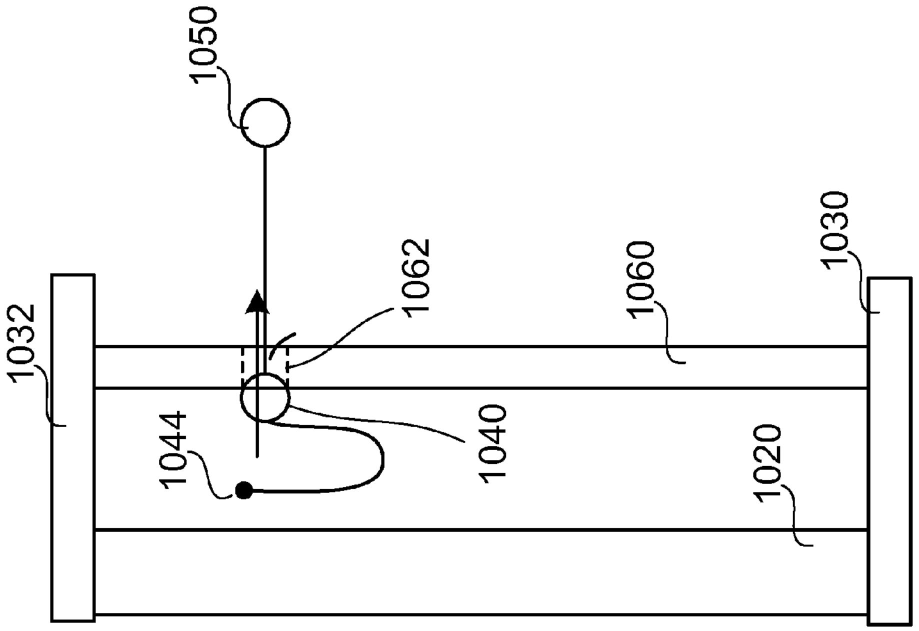
Figure 14D:
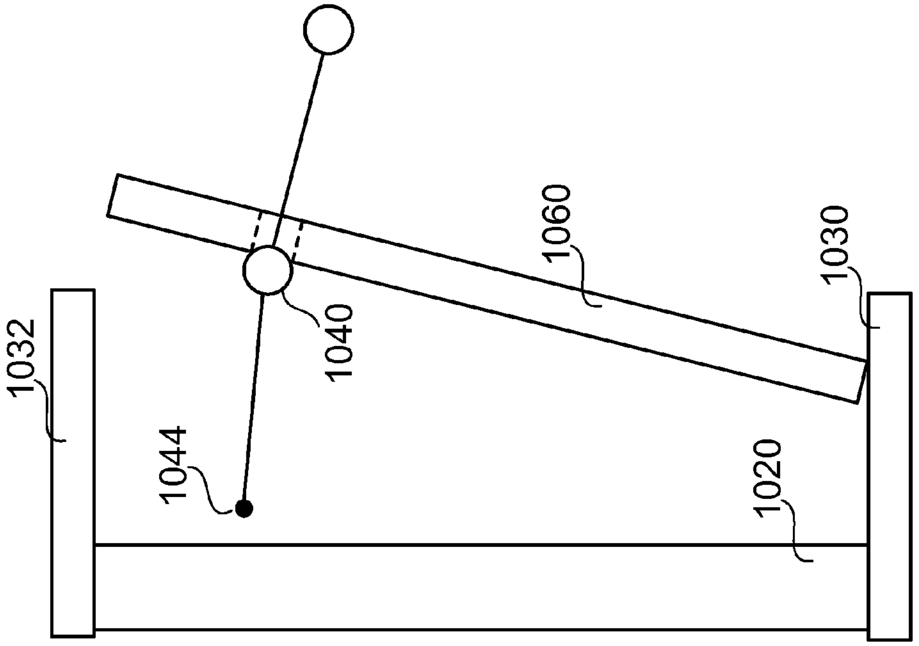

FIGS. 14C and 14D illustrate how the same system can be used in an easy removal system. When a user wishes to remove the storm window 1060 from the window frame 1030, the user pulls on the light ball 1050. This raises the heavy ball 1040 by virtue of the string being pulled through the hole 1062. Further pulling will eventually cause the heavy ball 1040 to contact the inside of the hole 1062, as illustrated in FIG. 14C. Further pulling on the light ball 1050 will cause the heavy ball 1040 to exert pressure on the inside surface of the storm window 1060, eventually dislodging the storm window from the window frame, as illustrated in FIG. 14D. From the position illustrated in FIG. 14D, the user can slip his or her hand into the window frame and detach the string at the attachment 1044 to complete the removal. In an especially large wind event, the same system works to additionally retain the storm window 1060 from a complete blowout should the hole 1062 in the storm window be too small to sufficiently vent the wind pressure.

Figure 15B:
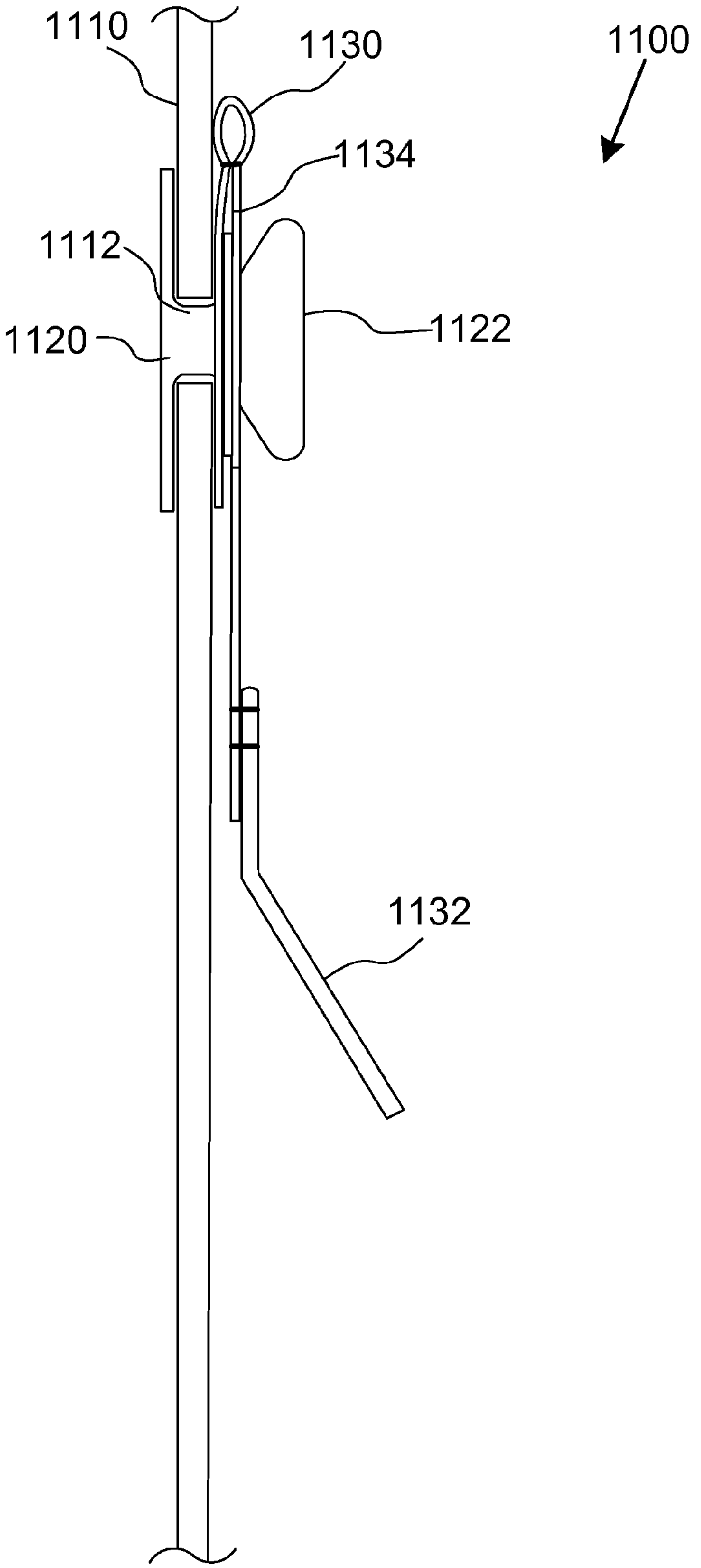
FIGS. 15A, 15B, and 15C are diagrams illustrating a retaining system according to embodiments of the invention.
Figure 15C:
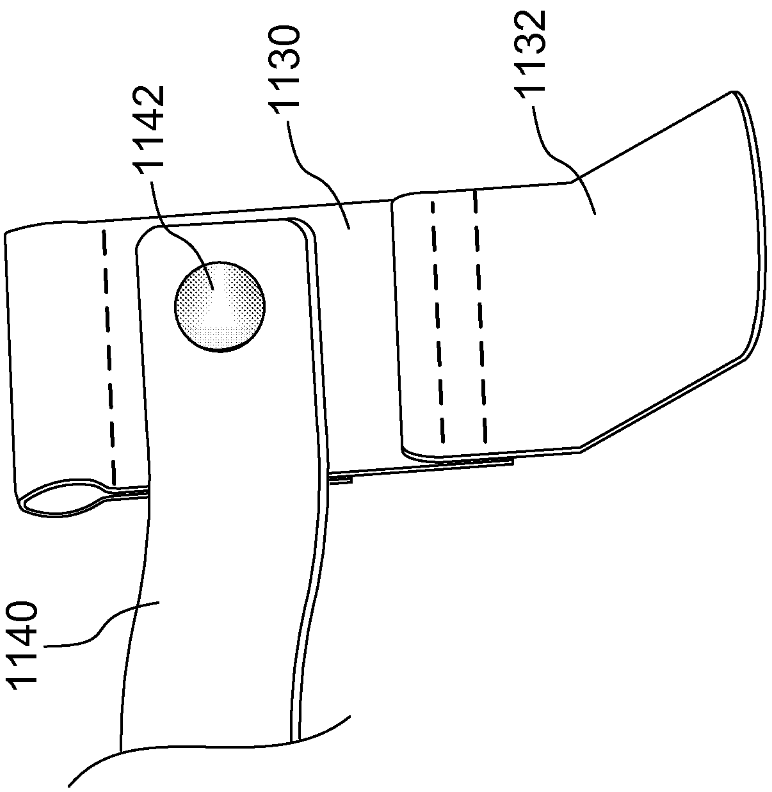
Figure 15A:
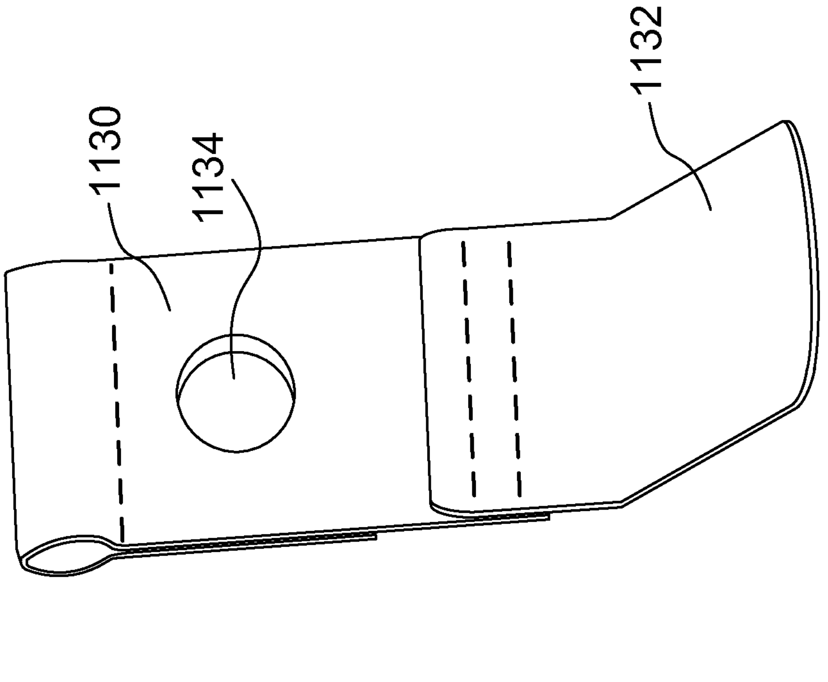

FIGS. 15A, 15B, and 15C illustrate a storm window integrated retention system according to embodiments of the invention. In these illustrations, a storm window 1100 may be the same type of window described above, i.e., one structured to be press-fit into a window frame. Of course, this facet of the invention is applicable to other types of windows as well.

The storm window 1100 includes a panel 1110, such as glazing or plastic, having a hole 1112 therethrough. Within the hole 1112 is a male portion of a snap, including a stud post 1120, which in turn is attached to a snap stud 1122. The strap 1130 is attached to the panel 1110 by first passing the stud post 1120 through a hole in the strap, then sandwiching the strap between the stud post 1120 and the snap stud 1122.

The strap 1130 further includes a snap hole 1134 (FIG. 15A) through which the snap stud 1122 passes, so that a face surface of the strap 1130 (furthest away from the panel 1110) lies generally flat against the panel when installed, as illustrated in FIG. 15B. A pull tab 1132 may be integrated into the strap 1130, or may be attached separately as illustrated in FIGS. 15A-15C. In the illustrated example the pull tab 1132 is made of a different material than the strap 1130, and is attached to the strap by stitching. Of course other embodiments are possible. In a preferred embodiment the pull tab 1132 is attached to the strap 1130 such that the pull tab extends away from the panel 1110, allowing the user to easily grab the pull tab.

As illustrated in FIG. 15C, a retaining strap 1140 is attached to the window frame (not illustrated) supporting the storm window 1100. The retaining strap 1140 includes a snap cap 1142. When the retention system is installed, the snap cap 1142 is securely fastened onto the stud 1122 supported by the storm window 1100, thereby keeping the storm window in place by the secure retaining strap 1140.

If there is a need to remove the storm window 1100, for example during an emergency when rapid egress is required, the retention system is easily released and the storm window may be moved or completely removed. Specifically, in operation, the user merely grabs the pull tab 1132 and pulls the tab away from the window 1100. Pulling on the pull tab 1132 causes the strap 1130 to lift away from the panel 1110, and the hole 1134 passes over the snap stud 1122 by virtue of the lifting. The strap 1130 then exerts pressure on the retaining strap 1140 (FIG. 15C), and, depending on the diameter of the hole 1134, on the stud cap 1142 as well. This outward pressure causes the snap cap 1142 to release from the snap stud 1122, thereby separating the window 1100 from the retention system.

Recall, however, that the strap 1130 is affixed to the panel 1110 by virtue of the snap post 1120 and other portions of the system. Because the strap 1130 is so attached to the window 1100, continued pulling on the pull tab 1132 allows the user to remove the window from the window frame, or at least dislodge the window far enough to gain access to the outside window, such as illustrated above. Then the user may open the outside window as if the storm window had not been put in place. Thus the retention system allows for rapid egress out of the window by a person in need of exiting through the window that has the storm window mounted within the window frame.

Figure 16C:
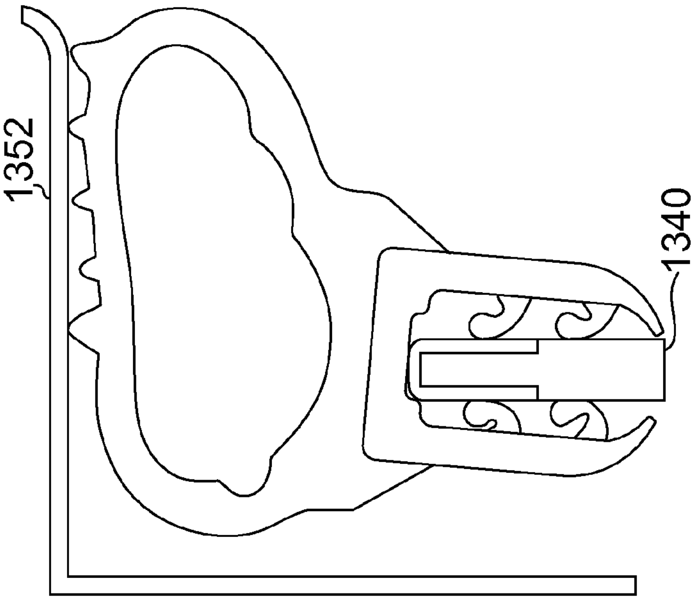
FIGS. 16A, 16B, and 16C are side cutaway views of a portion of a storm window according to embodiments of the present invention.
Figure 16B:
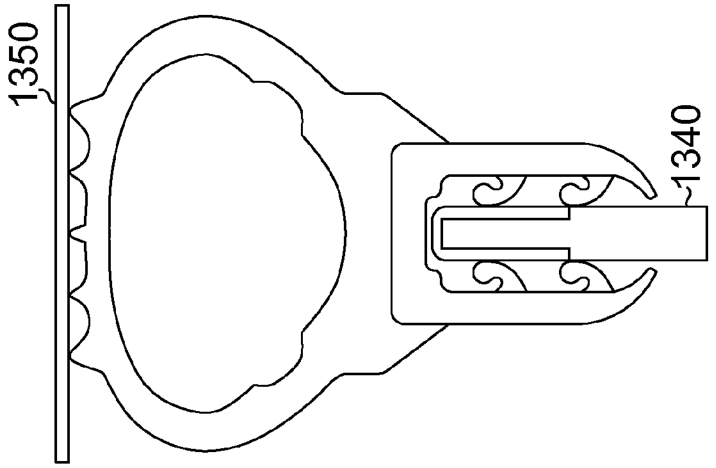
Figure 16A:
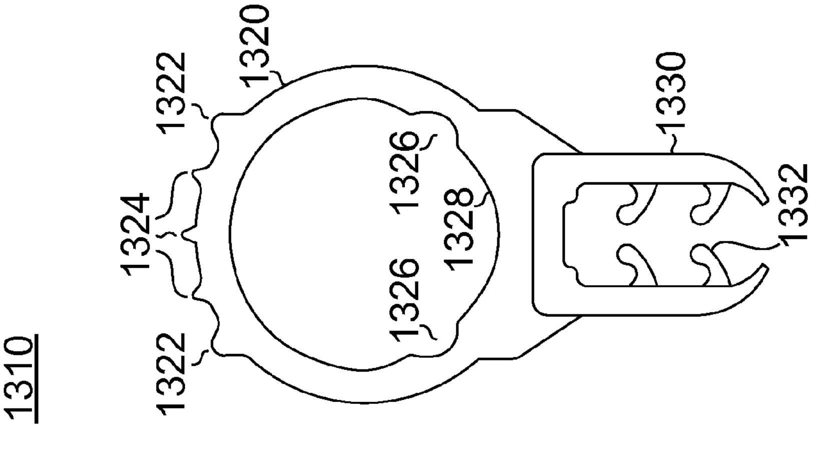

FIGS. 16A, 16B, and 16C illustrate another embodiment 1310 of the invention including a soft-bulb portion 1320 integrated with a rigid panel carrier 1330. In one embodiment the soft-bulb portion 1320 is co-produced with the rigid panel carrier 1330 and bonds to the carrier during production. In other embodiments the soft-bulb portion 1320 may be formed around an already existing rigid panel carrier 1330. In such embodiments the soft-bulb portion 1320 may be bound to the rigid panel carrier 1330, or may be attached to the carrier by other means, such as glue, epoxy, sonic bonding, or other bonding methods. Alternatively, or in addition, the soft bulb portion 1320 may include a tongue or other extension that may engage a receiving slot formed in the carrier 1330. The embodiment 1310 may also be made by forming the soft-bulb portion 1320 separately from the rigid panel carrier 1330, and later binding the soft-bulb portion 1320 and carrier 1330 together using techniques described above.

The soft-bulb portion 1320 may optionally include one or more friction ribs 1322, 1324, the function of which is described above. In some embodiments, the friction ribs may include different sized ribs 1322, 1324, such as illustrated in FIG. 16A, with the outer ribs 1324 being larger and taller than the smaller ribs 1322. In other embodiments, central ribs 1324 may be larger than outer ribs 1322. Other rib shapes, sizes, and orientations may be used depending on implementation.

The soft-bulb portion 1320, as described above, may be made of from foam, silicone, EPDM, or PVC, or derivatives, or any other material having the properties desired. In a particular embodiment the soft-bulb portion 1320 is made of vulcanized polypropylene rubber, and more particularly of ThermoPlastic Vulcanisate (TPV), and even more particularly TPV 35A, which is widely available.

The soft-bulb portion 1320 may optionally include one or more relief grooves 1326 formed on an inside surface of material, as illustrated in FIG. 16A. These relief grooves 1326 cause the soft-bulb portion 1320 to deform more at the relief grooves than in other areas of the soft-bulb, as illustrated in FIGS. 16B and 16C. The relief grooves 1326 serve to help maintain a relatively constant reformative force even when the soft-bulb portion 1320 is exposed to various amounts of compression. For example, the relief grooves 1326 reduces the rate at which pressure builds on the panel 1340 during times of thermal expansion, and moderates the rate at which pressure is relieved from the panel 1340 during times of thermal contraction.

The rigid panel carrier 1330 is sized to accept a desired panel. As described above, the panel may commonly be glass or acrylic, or other panel having the desired properties, such as panels specifically selected for sound or light absorption. Within the rigid panel carrier 1330 are nubs 1432 sized and shaped to cradle the panel, such as a panel 1340 in FIGS. 16B and 16C within the panel carrier 1330. The nubs 1332 may be made of the TPV 35A, or may be made of another material selected for its properties. The nubs 1332 are preferably comparatively soft and yieldable, so that they deform as the panel 1340 is inserted within the carrier 1330. As illustrated in FIG. 16C, the positioning of the panel within the carrier 1330 as held by the nubs 1332 may help support the panel 1340 when inserted into a windowframe 1450 (FIG. 16B), and especially when the shape of the windowframe causes the panel 1340 to remain in an orientation that is not aligned with the center groove of the carrier 1330, as illustrated in FIG. 16C. Further, the panel 1340 may shift within the carrier 1330 as the embodiment 1310 is inserted or removed from a windowframe.

Figures 17A, 17B, 17C:
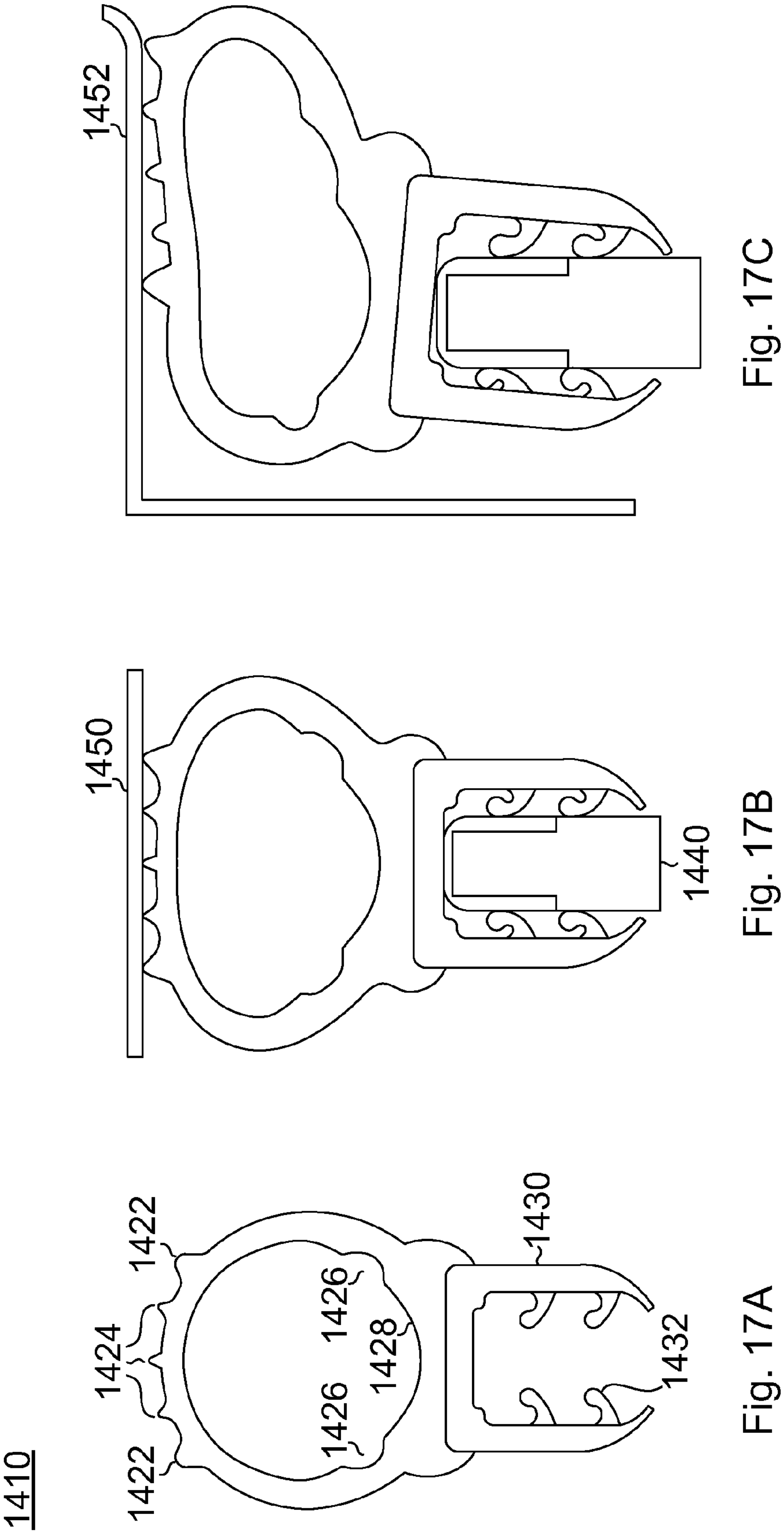
FIGS. 17A, 17B, and 17C are side cutaway views of a portion of a storm window according to other embodiments of the present invention.

FIGS. 17A, 17B, and 17C illustrate a similar embodiment 1410 that is similar in most respects to the embodiment 1310 of FIGS. 16A, 16B, and 16C, except that a rigid panel carrier 1430 is sized to accept a panel 1440 that is larger than the panel 1340 of FIGS. 16B and 16C, such as a double-thickness panel.

In other embodiments, the rigid carrier 1330, 1430 may be sized to accept a largest possible panel 1440, and also be structured to accept thickness-adjusting inserts placed in the rigid carrier to permit strong grip on thinner panels.

Any of the embodiments illustrated in FIGS. 16A-16C and 17A-17C may be used in conjunction with any of the controlled blowout features described above. Further, any of the embodiments illustrated in FIGS. 16A-16C and 17A-17C may be used on one or more edges, or portions of edges of a window, and the previously described embodiments, where the soft gasket material is used to further receive the panel it its groove, such as groove 107 of FIG. 1, may be used on the remaining edges of the window. This is similar to the embodiment described with reference to FIGS. 2 and 3 above, which described a rigid groove supporting the panel.

Also as described above with reference to FIG. 1, the soft-bulb portions 1320, 1420 of the supports 1310, 1410, respectively, may take one of several cross-sectional shapes. In FIGS. 16A-C and 17-C, the cross section of the bulb portion 103 of the material making the resilient support 110 is relatively circular, being formed from with an outer surface 102 around a center "hole." The cross section of the soft-bulb portions 1320, 1420 may take many shapes, as described below, and the "hole" may be partially or fully filled with additional resilient material, or another material, also as described above.

Figure 18A:
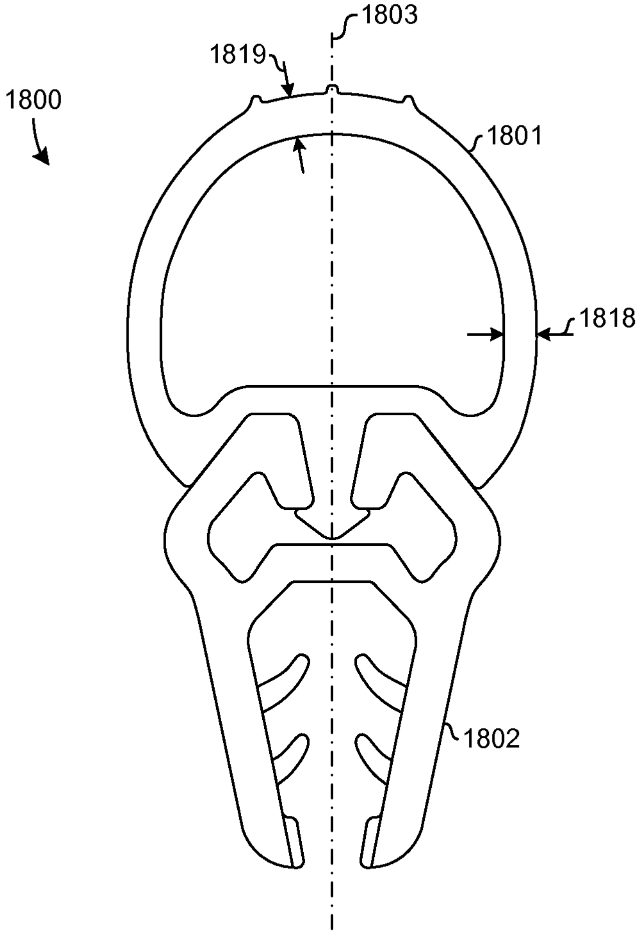
FIG. 18A is an end view of a portion of a system for mounting a secondary panel within a window frame of an existing window, according to embodiments of the invention.
Figure 18B:
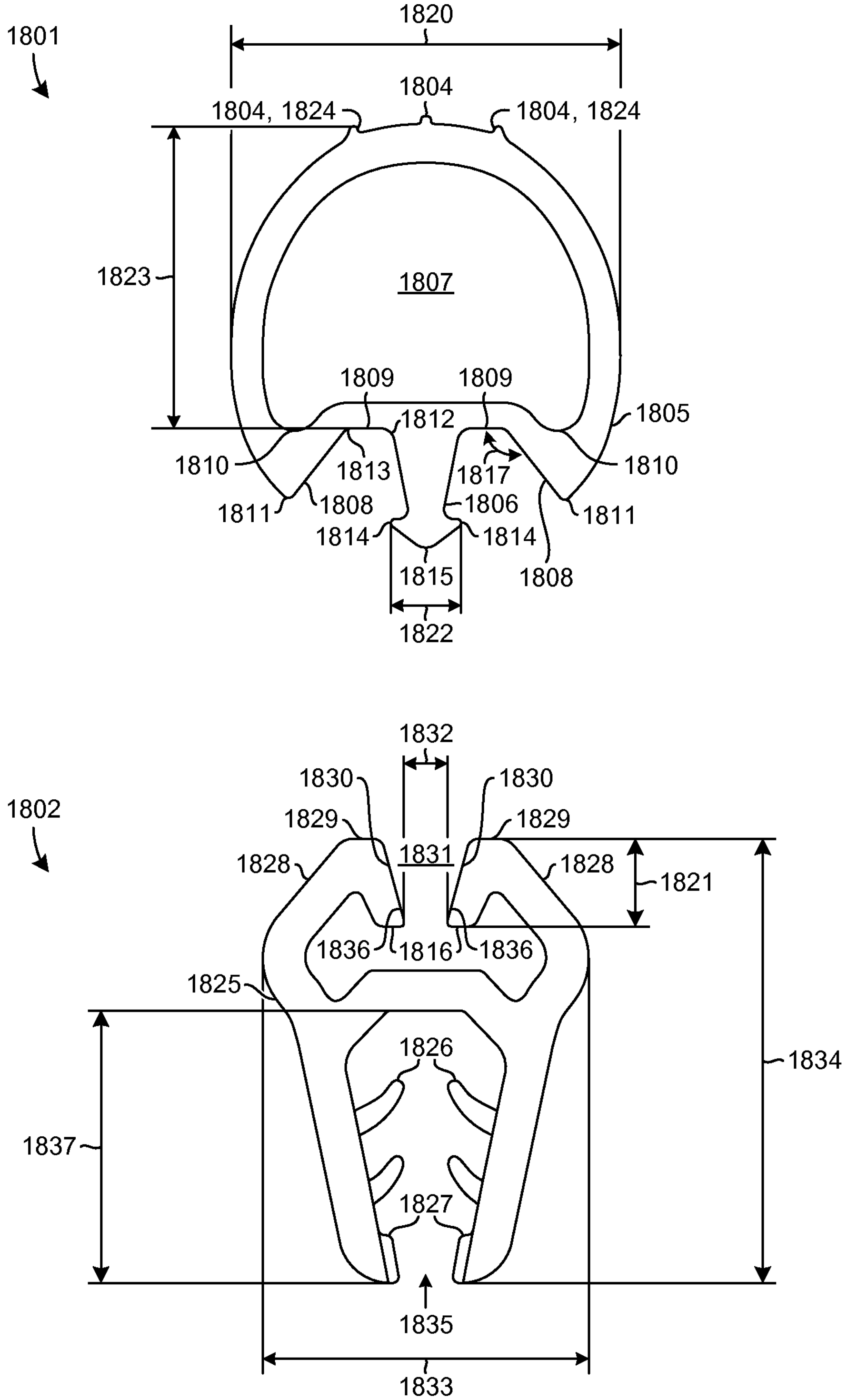
FIG. 18B is an exploded view of the portion shown in FIG. 18A.

FIG. 18A illustrates another embodiment of the invention including a soft-bulb portion 1801 and a carrier 1802. The soft-bulb portion 1801 and the carrier 1802 may be formed separately and then pressed, snapped, or otherwise mechanically coupled together to form an assembly, such as the assembly 1800 shown in FIG. 18A. FIG. 18B is an exploded view of the soft-bulb portion 1801 and the carrier 1802 before they are pressed together. Glue may be used in some particular embodiments to help affix the soft-bulb portion 1801 and the carrier 1802. In other embodiments, no glue is necessary to keep the soft-bulb portion 1801 and the carrier 1802 together, as described in more detail below.

The soft-bulb portion 1801 and the carrier 1802 are preferably extruded components. Thus, FIGS. 18A and 18B show end-view profiles of the soft-bulb portion 1801 and the carrier 1802, each of which may be elongated and extend to any length in a dimension perpendicular to the two-dimensional representations shown in FIGS. 18A and 18B. Additionally, the soft-bulb portion 1801 and the carrier 1802 preferably are each symmetric about a vertical centerline 1803. Thus, features shown or described for the right side of the vertical centerline preferably have corresponding, mirrored features on the left side of the vertical centerline, such as illustrated in FIGS. 18A and 18B.

Directions such as "vertical," "horizontal," "right," and "left" with respect to the soft-bulb portion or the carrier are used for convenience and in reference to the views provided in figures. The soft-bulb portion and the carrier may have a number of orientations during installation or use, and a feature that is vertical or horizontal in the figures may not have that same orientation in actual use.

The soft-bulb portion 1801, such as illustrated in FIGS. 18A and 18B, includes friction ribs 1804, a base section 1805, and a tongue 1806. Preferably, the soft-bulb portion 1801 is generally circular or rounded in cross section, enclosing a central void. More preferably, the soft-bulb portion 1801 is generally dome- or egg-shaped. Thus, the soft-bulb portion 1801 may have the form of the bulbs shown in FIG. 1, 7A, 16A, 17A, or 19A or any other appropriate bulb design. The void 1807 at the center of the soft-bulb portion 1801 may be empty except for air or another gas, or the void 1807 may be partially or fully filled with a resilient material. The soft-bulb portion 1801 is said to be "soft" because its shape is deformable or compressible, and not necessarily its material makeup, although either or both are possible.

The function of the friction ribs 1804 is as described above. Some friction ribs may be larger and taller than other friction ribs, such as described for FIGS. 16A, 16B, and 16C. Other rib shapes, sizes, and orientations may be used depending on implementation.

The base section 1805 includes angled faces 1808, horizontal faces 1809, internal corner grooves, or relief grooves, 1810, and outer corners 1811. The horizontal faces 1809 are generally perpendicular to the vertical centerline 1803 of the soft-bulb portion 1801. The horizontal faces 1809 have an inner end 1812 and an outer end 1813. The corner grooves 1810 may cause the soft-bulb portion 1801 to deform more at the corner grooves than in other areas of the soft-bulb portion. The function of the corner grooves 1810 may be as described above in FIG. 16A for the relief grooves 1326.

The tongue 1806 extends from the base section 1805 of the soft-bulb portion 1801 and from the inner ends 1812 of the horizontal faces 1809. The tongue 1806 includes shoulders 1814 at a distal end 1815 of the tongue 1806. The shoulders 1814 are configured to engage, and perhaps interlock with, edges 1816 of the carrier 1802, as described more fully below. Preferably, the tongue 1806 is symmetric about the vertical centerline 1803 of the soft-bulb portion 1801.

The angled faces 1808 extend from the outer ends 1813 of the horizontal faces 1809 and at an angle 1817 to the horizontal faces 1809. The outer corners 1811 are at outer ends 1813 of the angled faces 1808.

The soft-bulb portion 1801 may be made, for example, from foam, silicone, EPDM, or PVC. Preferably, the soft-bulb portion is made from a resilient polymer, such as silicone. More preferably, the soft-bulb portion is made from silicone having a hardness of about 50 durometer and conforming to the ASTM 2000 standard classification as set forth by ASTM International.

Preferably, the soft-bulb portion 1801 has a side wall thickness 1818 of between about 0.010 inch and about 0.110 inch. More preferably, the soft-bulb portion has a side wall thickness of between about 0.040 inch and about 0.080 inch. Even more preferably, the soft-bulb portion has a side wall thickness of between 0.052 inch and 0.068 inch. The top wall thickness 1819 of the soft-bulb portion may be greater than the side wall thickness 1818. For example, the top wall thickness may be about 15% to 35% greater than the side wall thickness. In one embodiment, the side wall thickness is approximately 0.060 inch and the top wall thickness is approximately 0.075 inch.

Preferably, the soft-bulb portion 1801 has an overall width 1820 of between about 1.25 inch and about 0.250 inch. More preferably, the soft-bulb portion has an overall width of between about 1.00 inch and about 0.500 inch. Even more preferably, the soft-bulb portion has an overall width of between 0.711 inch and 0.789 inch.

Preferably, the distance 1821 between the shoulders 1814 of the tongue 1806 and the horizontal faces 1809 is between about 0.225 inch and about 0.125 inch. More preferably, the distance between the shoulders and the horizontal faces is between about 0.210 inch and about 0.140 inch. Even more preferably, the distance between the shoulders and the horizontal faces is between 0.190 inch and 0.160 inch.

Preferably, the width 1822 across the shoulders 1814 is between about 0.200 inch and about 0.070 inch. More preferably, the width across the shoulders is between about 0.165 inch and about 0.105 inch. Even more preferably, the width across the shoulders is between 0.155 inch and 0.125 inch.

Preferably, the height 1823 between the horizontal faces 1809 and the top of an outer friction rib 1824 is between about 1.00 inch and about 0.190 inch. More preferably, the height between the horizontal faces and the top of an outer friction rib is between about 0.875 inch and about 0.285 inch. Even more preferably, the height between the horizontal faces and the top of an outer friction rib is between 0.614 inch and 0.552 inch.

Preferably, the angle 1817 between the horizontal face and the angled face is between about 95 degrees and about 175 degrees. More preferably, the angle between the horizontal face and the angled face is between about 115 degrees and about 145 degrees. In one embodiment, the angle is about 130 degrees.

The carrier 1802, such as illustrated in FIGS. 18A and 18B, includes a carrier body 1825, nubs 1826, and stabilizers 1827.

The nubs 1826 are generally as described above for FIGS. 16A, 16B, and 16C. In general, the nubs 1826 are sized, shaped, and configured to cradle a panel, such as the panel 1340 in FIGS. 16B and 16C, within the carrier 1802. Preferably, the nubs 1826 are comparatively soft and yieldable, relative to the panel and the carrier 1802, so that the nubs 1826 deform as the panel is inserted within a panel gap 1835 of the carrier 1802. While FIGS. 18A and 18B do not show a panel, the panel inserts into the carrier 1802 generally as shown in FIGS. 16B and 16C or, for a wider panel, as shown in FIGS. 17B and 17C.

The stabilizers 1827 are generally located on either side of the panel gap 1835 and protrude into the panel gap 1835. The stabilizers 1827 may provide lateral stability and alignment to the panel within the carrier 1802, and the stabilizers 1827 may help prevent dust and other contaminants from entering the panel gap 1835 when a panel is installed within the carrier 1802. For example, the stabilizers may be made from thermoplastic polyurethane (TPU). In some embodiments, the stabilizers 1827 may be configured to align the panel so that the panel is symmetric about the vertical centerline 1803 of the soft-bulb portion 1801 when the soft-bulb portion 1801 is assembled to the carrier 1802. In some embodiments, the stabilizers 1827 may be configured to align the panel so that the panel is not symmetric about the vertical centerline 1803 of the soft-bulb portion 1801 when the soft-bulb portion 1801 is assembled to the carrier 1802. A panel that is not symmetric about the vertical centerline of the bulb may be useful when, for example, the window frame is bowed in or out so that it is not straight. Thus, the position and type of nub 1826, such as its material and thickness, may be altered to change the alignment of the soft-bulb portion 1801 with respect to the panel and allow the user to fill in gaps caused by a bowed window frame.

The carrier body 1825 includes sloped faces 1828, top faces 1829, resilient prongs 1830, and a snap channel 1831. The sloped faces 1828 are configured to align with and contact the angled faces 1808 of the soft-bulb portion 1801 when the soft-bulb portion is assembled to the carrier 1802, such as shown in FIG. 18A. Accordingly, the slope of the sloped faces 1828 preferably matches or corresponds to the angle 1817 of the angled faces 1808. Likewise, the top faces 1829 are configured to align with and contact the horizontal faces 1809 of the soft-bulb portion 1801 when the soft-bulb portion 1801 is assembled to the carrier 1802, such as shown in FIG. 18A.

The resilient prongs 1830 extend into the snap channel 1831, and the distal end 1836 of each resilient prong 1830 includes an edge 1816.

Preferably, the width 1832 of the snap channel 1831 is between about 0.150 inch and about 0.035 inch. More preferably, the width of the snap channel is between about 0.125 inch and about 0.050 inch. Even more preferably, the width of the snap channel is between 0.100 inch and 0.066 inch.

Preferably, the width 1833 of the carrier body 1825 is between about 0.900 inch and about 0.200 inch. More preferably, the width of the carrier body is between about 0.750 inch and about 0.350 inch. Even more preferably, the width of the carrier body is between 0.630 inch and 0.568 inch.

Preferably, the overall height 1834 of the carrier body 1825 is between about 1.20 inch and about 0.500 inch. More preferably, the overall height of the carrier body is between about 1.00 inch and about 0.650 inch. Even more preferably, the overall height of the carrier body is between 0.856 inch and 0.778 inch.

Preferably, the depth 1837 of the panel gap 1835 is between about 1.00 inch and about 0.063 inch. More preferably, the depth of the panel gap is between about 0.750 inch and about 0.100 inch. Even more preferably, the depth of the panel gap is between 0.375 inch and 0.125 inch.

To assemble the soft-bulb portion 1801 to the carrier 1802, the tongue 1806 may be inserted into the snap channel 1831 until the shoulders 1814 of the tongue 1806 abut the edges 1816 of the resilient prongs 1830. The resiliency of the prongs allow the edges 1816 of the prongs 1830 to diverge, or separate, enough for the shoulders 1814, which may be pliable, of the tongue 1806 to pass the edges 1816 of the resilient prongs 1830 during the insertion process. Once the shoulders 1814 of the tongue 1806 pass the edges 1816 of the resilient prongs 1830, the resiliency of the prongs 1830 allows the edges 1816 of the prongs 1830 to converge again, thus causing the edges 1816 to engage with the shoulders 1814 of the tongue 1806, such as shown in FIG. 18A. With the tongue 1806 fully inserted into the snap channel 1831, the horizontal faces 1809 of the soft-bulb portion 1801 contact the top faces 1829 of the carrier 1802. Also, the angled faces 1808 and the outer corners 1811 of the soft-bulb portion 1801 contact the sloped faces 1828 of the carrier 1802.

Preferably, the carrier 1802 is made from a polymer, such as a thermoplastic polymer. The polymer may be rigid or semi-rigid. More preferably, the carrier body 1825 is made from acrylonitrile butadiene styrene (ABS), while the nubs 1826 and the stabilizers 1827 are made from thermoplastic polyurethane (TPU).

Figure 19A:
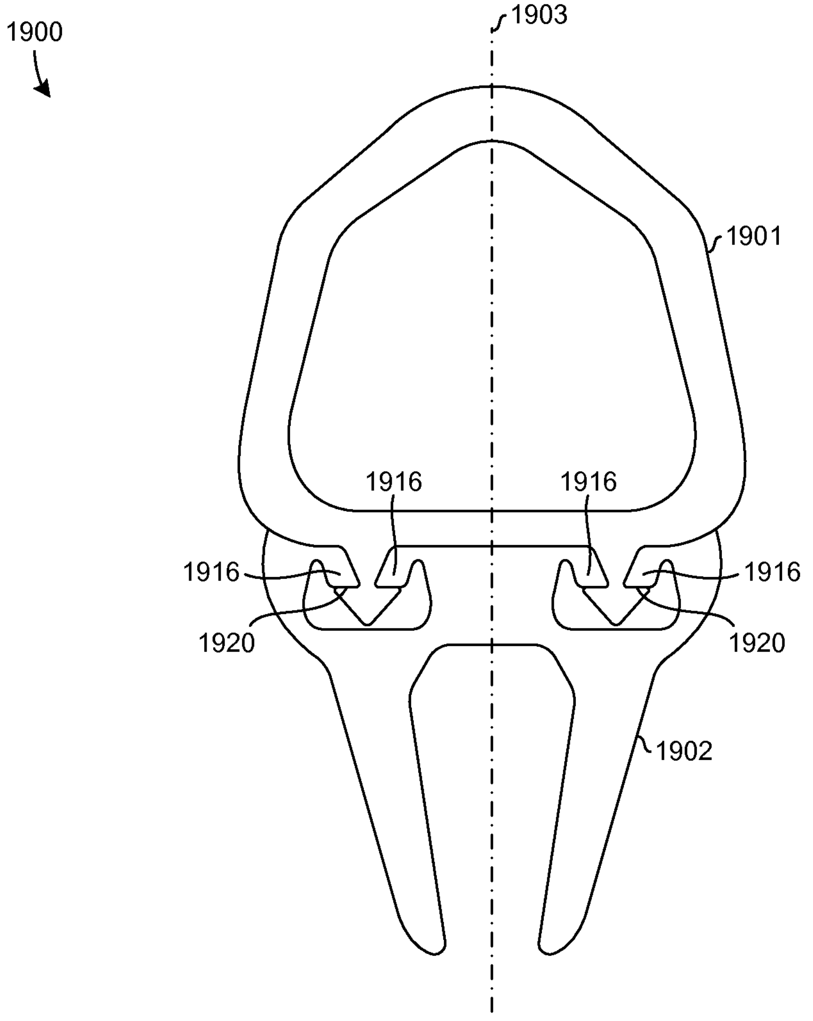
FIG. 19A is an end view of a portion of a system for mounting a secondary panel within a window frame of an existing window, according to embodiments of the invention.
Figure 19B:
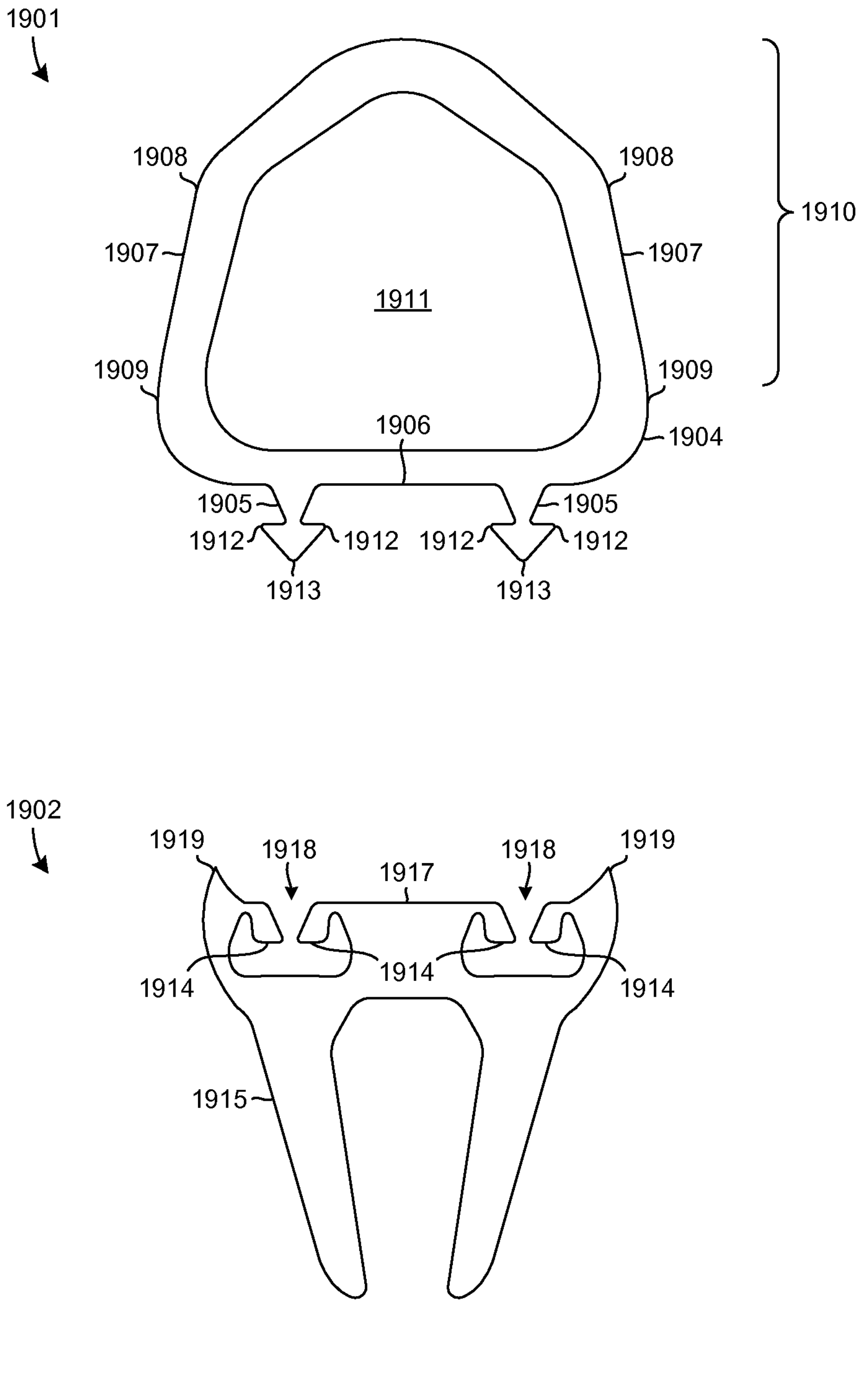
FIG. 19B is an exploded view of the portion shown in FIG. 19A.

FIG. 19A illustrates another embodiment of the invention including a soft-bulb portion 1901 and a carrier 1902. The soft-bulb portion 1901 and the carrier 1902 may be formed separately and then pressed, snapped, or otherwise mechanically coupled together to form an assembly, such as the assembly 1900 shown in FIG. 19A. FIG. 19B is an exploded view of the soft-bulb portion 1901 and the carrier 1902 before they are pressed together. Glue may be used in some particular embodiments to help affix the soft-bulb portion 1901 and the carrier 1902. In other embodiments, no glue is necessary to keep the soft-bulb portion 1901 and the carrier 1902 together, as described in more detail below.

As illustrated in FIGS. 19A and 19B, the soft-bulb portion 1901 and the carrier 1902 are preferably extruded components. Thus, FIGS. 19A and 19B show end-view profiles of the soft-bulb portion 1901 and the carrier 1902, each of which may be elongated and extend to any length in a dimension perpendicular to the two-dimensional representations shown in FIGS. 19A and 19B. Additionally, the soft-bulb portion 1901 and the carrier 1902 preferably are each symmetric about a vertical centerline 1903.

The soft-bulb portion 1901, such as illustrated in FIGS. 19A and 19B, includes a base section 1904 and tongues 1905. The base section 1904 includes a horizontal face 1906. While not shown in FIG. 19A or 19B, the soft-bulb portion 1901 may include friction ribs having the shapes, sizes, and orientations as generally as described above. While not shown in FIG. 19A or 19B, the soft-bulb portion 1901 may also include corner grooves, or relief grooves, such as those described above for FIGS. 18A and 18B.

Preferably, the soft-bulb portion 1901 is generally circular or rounded in cross section, enclosing a central void. More preferably, the cross-sectional profile of the soft-bulb portion 1901 is generally in the shape of a domed or rounded pentagon, for example as shown in FIGS. 19A and 19B, although other bulb profiles could be used. Thus, the soft-bulb portion 1801 may have the form of the bulbs shown in FIG. 1, 7A, 16A, 17A, or 18A or any other appropriate bulb design. The side walls 1907 of the soft-bulb portion 1901 may collectively angle toward the vertical centerline 1903, such that top ends 1908 of the side walls 1907 are closer together than bottom ends 1909 of the side walls 1907. In the event of a non-vertical force applied to the soft-bulb portion 1901, the angled side walls 1907 may allow the soft-bulb portion 1901 to deform first at a top section 1910 of the soft-bulb portion 1901 before the base section 1904, which may improve the lateral stability of the soft-bulb portion 1901 within the assembly 1900. A void 1911 at the center of the soft-bulb portion 1901 may be empty except for air or another gas, or the void 1911 may be partially or fully filled with a resilient material.

Each of the tongues 1905 extends from the base section 1904 of the soft-bulb portion 1901. The tongues 1905 includes shoulders 1912 at distal ends 1913 of the tongues 1905. The shoulders 1912 are shaped and configured to engage, and perhaps interlock with, edges 1914 of the carrier 1902, such as described above for FIGS. 18A and 18B. Preferably, the tongues 1905 are collectively symmetric about the vertical centerline 1903 of the soft-bulb portion 1901. While the embodiment illustrated in FIGS. 19A and 19B includes two tongues 1905, some embodiments have more than two tongues 1905.

The soft-bulb portion 1901 may be made, for example, from foam, silicone, EPDM, or PVC. Preferably, the soft-bulb portion is made from a resilient polymer, such as silicone. More preferably, the soft-bulb portion is made from silicone having a hardness of about 50 durometer and conforming to the ASTM 2000 standard classification as set forth by ASTM International.

The carrier 1902, such as illustrated in FIGS. 19A and 19B, includes a carrier body 1915. While not shown in FIGS. 19A and 19B, the carrier 1902 may also include nubs and stabilizers, such as the nubs and stabilizers discussed above for FIGS. 18A and 18B. As noted above, a panel inserts into the carrier 1902 generally as shown in FIGS. 16B and 16C or, for a wider panel, as shown in FIGS. 17B and 17C.

The carrier body 1915 includes resilient prongs 1916, a top face 1917, snap channels 1918, and outer corners 1919. The top face 1917 is configured to align with and contact the horizontal face 1906 of the soft-bulb portion 1901 when the soft-bulb portion 1901 is assembled to the carrier 1902, such as shown in FIG. 18A. The resilient prongs 1916 extend into the snap channel 1918, and a distal end 1920 of each resilient prong 1916 includes an edge 1914. Each snap channel 1918 provides a passage between the resilient prongs 1916 for insertion of the tongue 1905 of the soft-bulb portion 1901.

Preferably, the carrier 1902 is made from a polymer, such as a thermoplastic polymer. The polymer may be rigid or semi-rigid. More preferably, the carrier body 1915 is made from acrylonitrile butadiene styrene (ABS), while the nubs and the stabilizers are made from thermoplastic polyurethane (TPU).

To assemble the soft-bulb portion 1901 to the carrier 1902, the process is similar to what is described above for FIGS. 18A and 18B. That is, each of the tongues 1905 may be inserted into the respective snap channel 1918 until the shoulders 1912 of the tongue 1905 abut the edges 1914 of the resilient prongs 1916. With the tongue 1905 fully inserted into the snap channel 1918, the horizontal faces 1906 of the soft-bulb portion 1901 contact the top faces 1917 of the carrier 1902. Also, the outer corners 1919 of the carrier 1902 contact the base section 1904 of the soft-bulb portion 1901. The relatively broad base section 1904 of the soft-bulb portion 1901 and the relatively wide top faces 1917 of the carrier 1902, as measured between the outer corners 1919 of the carrier 1902, may help increase lateral stability of the assembly 1900 in the event a non-vertical force is applied to the soft-bulb portion 1901 or the carrier 1902.

One important metric for systems for mounting a secondary panel within a window frame is called slip force. Slip force is a measure of the lateral load that an assembly can withstand without slipping as measured at various amounts of bulb compression. For example, a surface may be placed against the top of the soft-bulb portion 1901 of FIG. 19A, and the soft-bulb portion 1901 may be compressed to various amounts in a direction parallel to the vertical centerline 1903. Those various amounts may be, for example, increments of 1/16 of an inch. At each increment, a force is applied to the soft-bulb portion 1901 and in a direction perpendicular to the vertical centerline 1903. The force may be expressed as force per unit length, such as per inch, of the soft-bulb portion 1901.

On the one hand, the slip force metric should be sufficiently high enough to help prevent the secondary panel from dislodging from the window frame under typical conditions. For example, as noted above, when forceful winds blow from outside the window through air gaps in older windows, they may create significant pressure on the secondary window mounted inside. On the other hand, the slip force metric should be sufficiently low enough to help prevent the buildup of air pressure between the secondary panel and the existing window. As discussed above, that can also dislodge the secondary panel from dislodging from the window frame. Accordingly, it is preferred that the slip force changes relatively little as compression of the bulb increases.

Secondary panel systems incorporating an assembly, such as the assembly 1900, may have a slip force that increases less than 50% as the bulb compression increases from about 10% of overall bulb height to about 65% of overall bulb height. By comparison, some conventional panel systems have a slip force that increases over 400% for the same compression interval.

Another important set of metrics for systems for mounting a secondary panel within a window frame are the push force and the pull force. The push force is the force, per unit area, that it takes to dislodge a mounted secondary panel from a window frame. In other words, it is a measure of the resistance to air pressure acting, or pushing, on the panel. By contrast, pull force is a measure of the effort it takes to dislodge the panel by pulling it, from a localized point on the panel, rather than pushing it. The pull force, for example, may quantify how difficult it would be for a user to intentionally dislodge the mounted panel from a window frame by pulling on the panel. The pull force and push force are generally determined relative to a frame depth, which is how deep into a window frame the panel, including the bulb and the carrier, is mounted.

At a frame depth of about ¾ inch, secondary panel systems incorporating an assembly, such as the assembly 1900, may have a push force that is about 5.2 pounds per square foot and a pull force of about 10.5 pounds on a panel having an area of about 3.5 square feet.

Figure 20B:
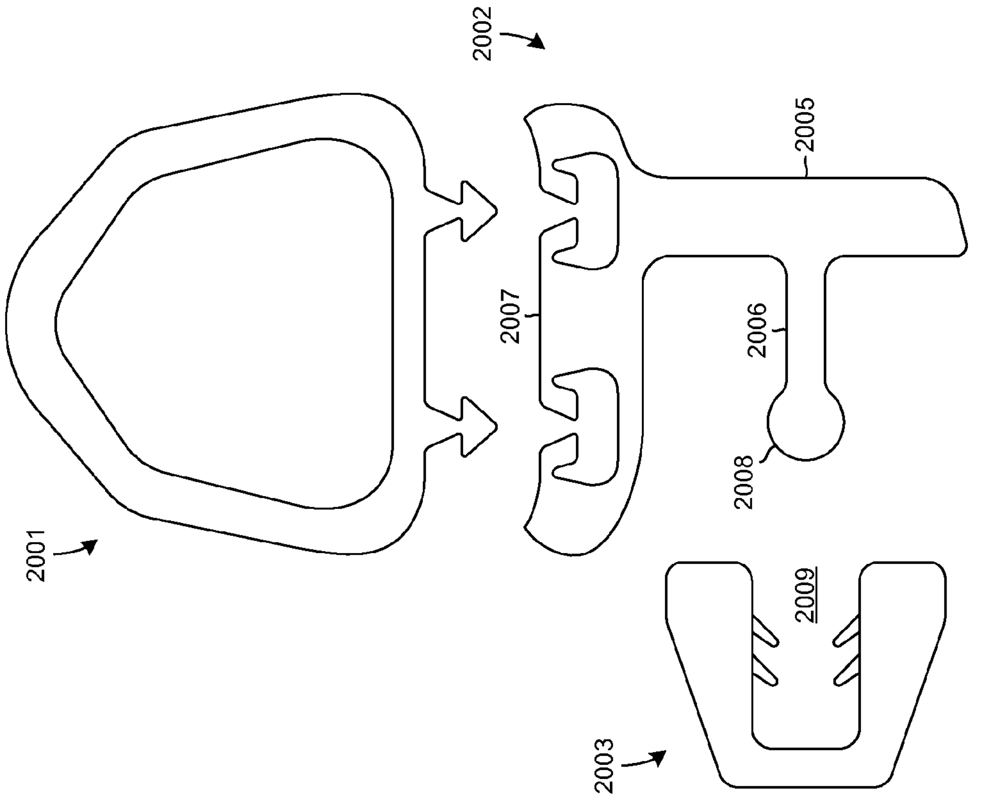
FIG. 20B is an exploded view of the portion shown in FIG. 20A.
Figure 20A:
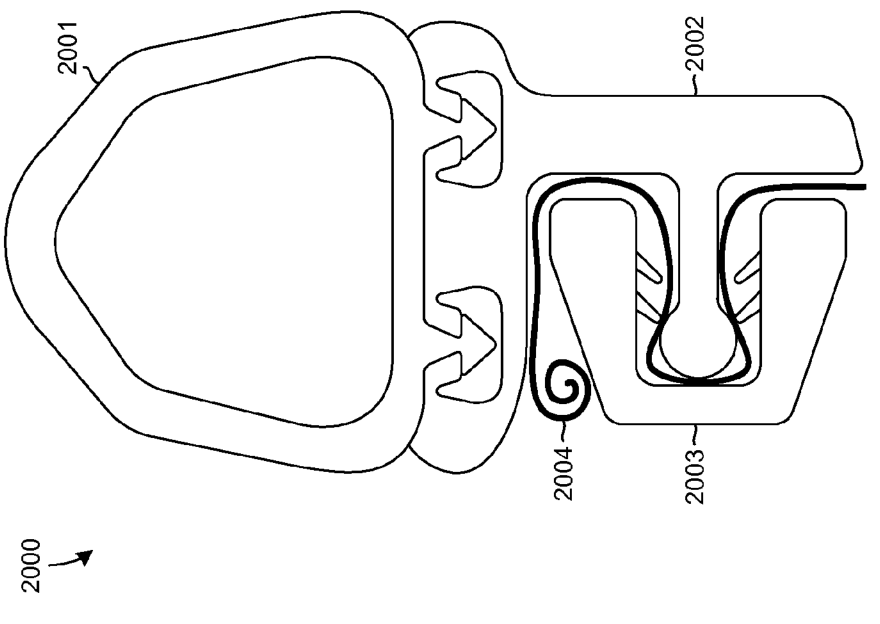
FIG. 20A is an end view of a portion of a system for mounting a flexible sheet within a window frame of an existing window, according to embodiments of the invention.

FIG. 20A illustrates another embodiment of the invention including a soft-bulb portion 2001, a carrier or frame 2002, and a snap bead or receiver 2003. The soft-bulb portion 2001, the carrier 2002, and the snap bead 2003 may be formed separately and then pressed or snapped together to form an assembly, such as the assembly 2000 shown in FIG. 20A. The carrier 2002 and the snap bead 2003 may be pressed or snapped together over a flexible sheet 2004, such as a plastic film or a screen. Thus, for example, the assembly 2000 may serve as a frame or edging for a window screen. FIG. 20B is an exploded view of the soft-bulb portion 2001, the carrier 2002, and the snap bead 2003 before they are pressed together.

As illustrated in FIGS. 20A and 20B, the soft-bulb portion 2001, the carrier 2002, and the snap bead 2003 are preferably extruded components. Thus, FIGS. 20A and 20B show end-view profiles of the soft-bulb portion 2001, the carrier 2002, and the snap bead 2003, each of which may be elongated extend to any length in a dimension perpendicular to the two-dimensional representations shown in FIGS. 20A and 20B.

The soft-bulb portion 2001 is generally as described above for FIGS. 19A and 19B. Also, the carrier 2002 includes resilient prongs, a top face, snap channels, and outer corners, such as described above for FIGS. 19A and 19B. The soft-bulb portion 2001 may be connected to the carrier 2002 generally as described above for FIGS. 19A and 19B.

As illustrated in FIGS. 20A and 20B, the carrier 2002 includes an arm 2005 having a protrusion 2006. The arm 2005 may provide physical separation between the protrusion 2006 and the top face 2007 of the carrier 2002. The protrusion 2006 is configured to engage, and possibly interlock with, the snap bead 2003. For example, the protrusion 2006 may have a rounded tip 2008, such as shown in FIGS. 20A and 20B. Preferably, the protrusion 2006 extends from the arm 2006 at a non-parallel angle. For example, the protrusion may extend at a 45, 90, or 150 degree angle from the arm, although other angles are also feasible.

The snap bead 2003 includes a gap 2009 and may include nubs, such as the nubs discussed above for FIGS. 18A and 18B. In the assembly 2000, though, the nubs may help position the protrusion 2006 and the screen 2004 within the gap 2009. Thus, the nubs are preferably comparatively soft and yieldable, so that they deform as the protrusion 2006 is inserted within the gap 2009. The gap 2009 is configured to accept the protrusion 2006 of the arm 2005 and to receive or pinch the screen 2004 between the protrusion 2006 and the snap bead 2003. To remove the screen 2004, the snap bead 2003 may be disengaged from, or pulled off of, the protrusion 2006.

Preferably, the carrier 2002 and the snap bead 2003 are each made from a polymer, such as a thermoplastic polymer. The polymer may be rigid or semi-rigid. More preferably, the carrier and the snap bead are made from acrylonitrile butadiene styrene (ABS).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A system for mounting a secondary, rigid panel within a window frame of an existing window in a building, the system comprising:

a rigid panel having an edge;

an elongated, deformable bulb having a resilient, rounded portion and a base section, the base section having at least one tongue extending from the base section; and an elongated carrier configured to receive at least a portion of the edge of the panel within a panel gap of the carrier, the carrier having at least one channel having opposing, resilient prongs, the at least one channel configured to securely receive, between the resilient prongs, the at least one tongue of the deformable bulb, the resilient prongs configured to diverge to allow a distal end of the at least one tongue to pass between the resilient prongs in which the bulb and the carrier are symmetric about a common centerline.

2. The system of claim 1, in which the at least one tongue is a pair of tongues symmetric about a centerline of the bulb, and in which the at least one channel is a pair of channels where each channel is configured to securely receive one of the pair of tongues between the resilient prongs of the channel.

3. The system of claim 2, in which the base section of the bulb includes a horizontal face and the carrier includes a top face, in which, when the pair of tongues is securely received into the pair of channels, the horizontal face of the bulb contacts the top face of the carrier.

4. The system of claim 2, in which the each of the pair of tongues includes shoulders at the distal end of the tongue, the shoulders configured to abut edges at distal ends of the resilient prongs.

5. The system of claim 2, in which the carrier further includes yieldable nubs within the panel gap, the nubs structured to support and retain the panel within the carrier.

6. The system of claim 2, in which the carrier further includes stabilizers on opposing sides within the panel gap, the stabilizers configured to provide lateral stability to the panel within the carrier, the stabilizers further configured to align the panel so that the panel is not symmetric about a vertical centerline of the soft-bulb portion.

7. The system of claim 2, in which the bulb further includes further includes friction ribs on an outer portion of the bulb, the friction ribs configured to increase friction between the bulb and the window frame.

8. The system of claim 1, in which the bulb has an internal corner groove at a transition between the rounded portion and the base section of the bulb.

* * * * *